(12) United States Patent
Ianni et al.

(10) Patent No.: US 10,159,888 B2
(45) Date of Patent: Dec. 25, 2018

(54) LOCATION AND EVENT TRACKING SYSTEM FOR GAMES OF SPORT

(71) Applicant: SHOTTRACKER, INC., Mission Hills, KS (US)

(72) Inventors: Bruce C. Ianni, Mission Hills, KS (US); Davyeon D. Ross, Overland Park, KS (US); Clint A. Kahler, Overland Park, KS (US); Thomas J. Keeley, Kansas City, MO (US)

(73) Assignee: SHOTTRACKER, INC., Merriam, KS (US)

( * ) Notice: Subject to any disclaimer, the term of this patent is extended or adjusted under 35 U.S.C. 154(b) by 143 days.

(21) Appl. No.: 15/347,586

(22) Filed: Nov. 9, 2016

(65) Prior Publication Data

US 2017/0128814 A1    May 11, 2017

Related U.S. Application Data

(60) Provisional application No. 62/253,554, filed on Nov. 10, 2015.

(51) Int. Cl.
*A63B 71/06* (2006.01)
*H04W 4/02* (2018.01)
(Continued)

(52) U.S. Cl.
CPC ...... *A63B 71/0605* (2013.01); *A63B 71/0669* (2013.01); *H04L 67/18* (2013.01);
(Continued)

(58) Field of Classification Search
CPC .............................. A63B 71/06; A63B 24/0062
See application file for complete search history.

(56) References Cited

U.S. PATENT DOCUMENTS

| 4,438,588 A | 3/1984 | Martin |
| 5,293,354 A | 3/1994 | Costabile |

(Continued)

FOREIGN PATENT DOCUMENTS

| EP | 1232772 A2 | 8/2002 |
| EP | 2472288 A1 | 7/2012 |

(Continued)

OTHER PUBLICATIONS

Baca et al. "Rapid feedback systems for elite sports training." Pervasive Computing, IEEE 5.4 (2006): 70-76.
(Continued)

*Primary Examiner* — James S McClellan
*Assistant Examiner* — Kevin Carter
(74) *Attorney, Agent, or Firm* — Grady L. White; Potomac Law Group, PLLC

(57) ABSTRACT

A location-and-event-tracking system includes radio-enabled anchors and tags on a field of play, e.g., a basketball court. Tags are attached to players and to balls or other game-play objects. The system determines the location in space of each of the tags. For tags connected to game-play objects, the system evaluates proximity to players to assess possession of the game-play object. If the game-play-object tag is not sufficiently close to a player for the player to be in possession of the object, the position of the game-play object is evaluated to determine whether the game-pay object is in a goal zone region. If so and the game-play object has been within an attempt zone, i.e., a sub-zone within the goal zone region, then the system determines whether a goal has been made by evaluating whether the game-play object passed in order through a number of sub-regions before, at, and after the goal.

25 Claims, 19 Drawing Sheets

(51) Int. Cl.
*H04L 29/08* (2006.01)
*H04W 4/029* (2018.01)
*A63B 24/00* (2006.01)

(52) U.S. Cl.
CPC ............ *H04W 4/02* (2013.01); *H04W 4/029* (2018.02); *A63B 2024/0025* (2013.01); *A63B 2024/0028* (2013.01); *A63B 2220/12* (2013.01); *A63B 2225/50* (2013.01)

(56) References Cited

U.S. PATENT DOCUMENTS

| | | | |
|---|---|---|---|
| 5,316,293 | A | 5/1994 | Hamilton |
| 5,526,326 | A | 6/1996 | Fekete et al. |
| 5,697,791 | A | 12/1997 | Nashner et al. |
| 5,776,018 | A | 7/1998 | Simpson et al. |
| 5,871,406 | A | 2/1999 | Worrell |
| 6,157,898 | A | 12/2000 | Marinelli |
| 6,177,861 | B1 | 1/2001 | MacLellan et al. |
| 6,280,352 | B1 | 8/2001 | Coffeen et al. |
| 6,389,368 | B1 | 5/2002 | Hampton |
| 6,418,179 | B1 | 7/2002 | Shieh |
| 6,514,160 | B1* | 2/2003 | Cooper .................. A63C 19/00 473/415 |
| 6,582,329 | B1 | 6/2003 | Cabrera |
| 6,620,057 | B1 | 9/2003 | Pirritano et al. |
| 6,946,950 | B1 | 9/2005 | Ueno et al. |
| 7,091,863 | B2 | 8/2006 | Ravet |
| 7,095,312 | B2 | 8/2006 | Erario et al. |
| 7,182,704 | B2 | 2/2007 | Levy |
| 7,625,314 | B2 | 12/2009 | Ungari et al. |
| 7,771,320 | B2 | 8/2010 | Riley et al. |
| 7,843,348 | B2 | 11/2010 | Hayford et al. |
| 7,854,669 | B2 | 12/2010 | Marty et al. |
| 7,920,052 | B2 | 4/2011 | Costabile |
| 7,949,295 | B2 | 5/2011 | Kumar et al. |
| 8,038,549 | B2 | 10/2011 | Vann |
| 8,079,925 | B2 | 12/2011 | Englert et al. |
| 8,099,258 | B2 | 1/2012 | Alten et al. |
| 8,231,487 | B2 | 7/2012 | Nurnberg et al. |
| 8,248,212 | B2 | 8/2012 | Frederick |
| 8,249,254 | B1 | 8/2012 | Daniel |
| 8,289,170 | B2 | 10/2012 | Pryor et al. |
| 8,360,904 | B2 | 1/2013 | Oleson et al. |
| 8,465,382 | B2 | 6/2013 | Moye |
| 8,517,869 | B2 | 8/2013 | Steidle |
| 8,540,560 | B2 | 9/2013 | Crowley et al. |
| 8,579,632 | B2 | 11/2013 | Crowley |
| 8,597,095 | B2 | 12/2013 | Crowley et al. |
| 8,622,832 | B2 | 1/2014 | Marty et al. |
| 8,687,546 | B2 | 4/2014 | Gong et al. |
| 8,702,430 | B2 | 4/2014 | Dibenedetto et al. |
| 8,777,815 | B2 | 7/2014 | Case et al. |
| 8,786,415 | B2 | 7/2014 | Cavallaro et al. |
| 8,951,106 | B2 | 2/2015 | Crowley et al. |
| 8,968,100 | B2 | 3/2015 | Hohteri |
| 9,041,546 | B2 | 5/2015 | Pryor et al. |
| 9,308,417 | B2 | 4/2016 | Grundy |
| 9,502,018 | B2 | 11/2016 | Cronin et al. |
| 9,849,361 | B2* | 12/2017 | Coza .................. A63B 69/002 |
| 2002/0107092 | A1 | 8/2002 | Gottlieb-Myers et al. |
| 2003/0054905 | A1 | 3/2003 | King |
| 2003/0181268 | A1 | 9/2003 | Nelson |
| 2004/0145342 | A1 | 7/2004 | Lyon |
| 2004/0160310 | A1 | 8/2004 | Chen et al. |
| 2005/0223799 | A1 | 10/2005 | Murphy |
| 2005/0225437 | A1 | 10/2005 | Shiotsu et al. |
| 2005/0261609 | A1 | 11/2005 | Collings et al. |
| 2006/0052055 | A1 | 3/2006 | Rowse et al. |
| 2006/0105857 | A1 | 5/2006 | Stark |
| 2007/0135243 | A1 | 6/2007 | LaRue et al. |
| 2007/0173355 | A1 | 7/2007 | Klein |
| 2007/0219024 | A1 | 9/2007 | Allegre |
| 2008/0015061 | A1 | 1/2008 | Klein |
| 2008/0088303 | A1 | 4/2008 | Englert |
| 2008/0274844 | A1 | 11/2008 | Ward |
| 2008/0298280 | A1 | 12/2008 | Joshi et al. |
| 2009/0048070 | A1 | 2/2009 | Vincent et al. |
| 2009/0111616 | A1 | 4/2009 | Creelman |
| 2009/0117525 | A1 | 5/2009 | Bavaro et al. |
| 2009/0191988 | A1 | 7/2009 | Klein |
| 2009/0256688 | A1 | 10/2009 | Khan |
| 2011/0054782 | A1 | 3/2011 | Kaahui |
| 2011/0176464 | A1 | 7/2011 | Warner et al. |
| 2012/0316843 | A1 | 12/2012 | Beno et al. |
| 2012/0322587 | A1 | 12/2012 | Duke |
| 2012/0323496 | A1 | 12/2012 | Burroughs et al. |
| 2013/0066448 | A1* | 3/2013 | Alonso .................. H04Q 9/00 700/91 |
| 2013/0130843 | A1* | 5/2013 | Burroughs .......... A63B 71/0686 473/415 |
| 2013/0167290 | A1 | 7/2013 | Ezra |
| 2013/0172131 | A1 | 7/2013 | Bove et al. |
| 2013/0182718 | A1 | 7/2013 | Kim et al. |
| 2014/0039651 | A1 | 2/2014 | Crowley |
| 2014/0135150 | A1 | 5/2014 | Thurman et al. |
| 2014/0135955 | A1 | 5/2014 | Burroughs |
| 2014/0135956 | A1 | 5/2014 | Thurman et al. |
| 2014/0135957 | A1 | 5/2014 | Thurman et al. |
| 2014/0135958 | A1 | 5/2014 | Thurman et al. |
| 2014/0135959 | A1 | 5/2014 | Thurman et al. |
| 2014/0195019 | A1 | 7/2014 | Thurman et al. |
| 2014/0195020 | A1 | 7/2014 | Thurman et al. |
| 2014/0195021 | A1 | 7/2014 | Thurman et al. |
| 2014/0195022 | A1 | 7/2014 | Thurman et al. |
| 2014/0200103 | A1 | 7/2014 | Thurman et al. |
| 2014/0200692 | A1 | 7/2014 | Thurman et al. |
| 2014/0222177 | A1 | 8/2014 | Thurman et al. |
| 2014/0247817 | A1 | 9/2014 | Lim et al. |
| 2014/0266759 | A1 | 9/2014 | Pryor et al. |
| 2014/0274486 | A1 | 9/2014 | Thurman |
| 2014/0274487 | A1 | 9/2014 | Thurman |
| 2014/0277634 | A1 | 9/2014 | Thurman |
| 2014/0277635 | A1 | 9/2014 | Thurman |
| 2014/0277636 | A1 | 9/2014 | Thurman |
| 2014/0364974 | A1* | 12/2014 | Wohl .................. G06K 7/10227 700/91 |
| 2015/0071158 | A1 | 3/2015 | Fan et al. |
| 2015/0112464 | A1 | 4/2015 | Crowley et al. |
| 2015/0265897 | A1* | 9/2015 | Gordon .............. A63B 69/0071 473/447 |
| 2015/0312493 | A1 | 10/2015 | Aldridge et al. |
| 2015/0312494 | A1 | 10/2015 | Aldridge et al. |
| 2015/0312497 | A1 | 10/2015 | Aldridge et al. |
| 2015/0312504 | A1 | 10/2015 | Aldridge et al. |
| 2015/0317801 | A1 | 11/2015 | Bentley et al. |
| 2016/0112727 | A1* | 4/2016 | Mate .................. H04N 21/2353 725/32 |
| 2017/0072283 | A1* | 3/2017 | Davisson .............. A61B 5/6895 |

FOREIGN PATENT DOCUMENTS

| | | |
|---|---|---|
| JP | 2000061016 A | 2/2000 |
| WO | 2001025946 A1 | 4/2001 |
| WO | 2004009188 A1 | 1/2004 |
| WO | 2006038163 A1 | 4/2006 |
| WO | 2007006083 A1 | 1/2007 |
| WO | 2007084850 A2 | 7/2007 |
| WO | 2007130057 A1 | 11/2007 |
| WO | 2012121434 A1 | 9/2012 |
| WO | 2013029035 A1 | 2/2013 |

OTHER PUBLICATIONS

Beetz et al. "Computerized real-time analysis of football games." Pervasive Computing, IEEE 4.3 (2005): 33-39.
Danner et al. "Description of the Physical Activity of Young Children Using Movement Sensor and Observation Methods," Pediatric Exercise Science. 1991.
http://shootersrev.com/product/evo-one-sensorized-basketball/,Sep. 2014.
http://shop.94fifty.com, Sep. 2014.

(56) References Cited

OTHER PUBLICATIONS http://swishmetrics.com, Sep. 2014.
http://vibradotech.com, Sep. 2014.
http://www.hooptracker.com, Sep. 2014.
http://www.noahbasketball.com/products, Sep. 2014.
http://www.shootaway.com, Sep. 2014.
http://www.wilson.com/smart/, Sep. 2014.
Introduction about Nintendo WII Software, Nintendo Korea, Jun. 24, 2010.

* cited by examiner

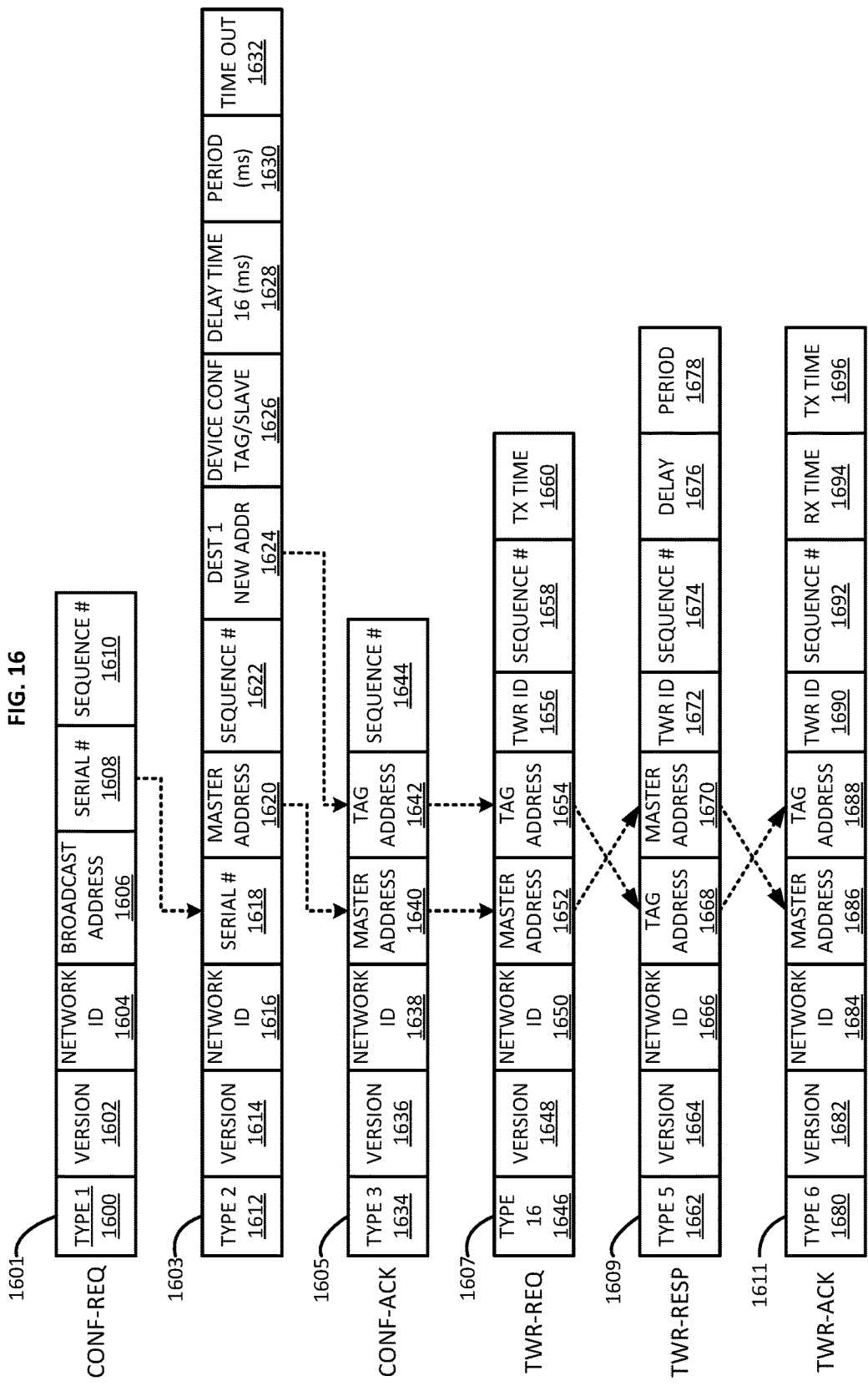

LOCATION AND EVENT TRACKING SYSTEM FOR GAMES OF SPORT

CROSS-REFERENCE TO RELATED APPLICATIONS

This application is related to and claims priority under 35 U.S.C. § 119 from U.S. provisional patent application No. 62/253,554 filed Nov. 10, 2015, the contents of which are incorporated herein by reference.

FIELD OF THE INVENTION

The present invention relates to games of sport, and more particularly to a system that uses remote sensors to track various objects in space (e.g., players, balls, goals, etc.) and identify in "real time" one or more game-related events as they occur.

BACKGROUND OF THE INVENTION

For most, if not all, sports activities, detailed review and analysis of how an individual player and/or a team of players is/are performing is crucial in order to improve performance. Therefore, tools that enhance the ability to identify and analyze various events that occur on a field of play (e.g., a basketball court, hockey rink, etc.) are desirable. Additionally, it can be difficult for some fans of a fast-paced sport, such as basketball, to see clearly everything that is going on all at once, given that the games may have many players and the ball (a "game-play object") all moving simultaneously. Therefore, to the extent the action of a sporting event can be monitored and analyzed, with the results of that analysis being displayed for the fans (and even coaches) to see, the fans' enjoyment of a game can be enhanced considerably by systems and devices that automatically monitor, track, and/or record the location and movement of players and objects on the field of play, as well as the occurrence of certain game-related events.

SUMMARY OF THE INVENTION

Embodiments of an installation in accordance with the invention feature a location-and-event-tracking system that includes radio-enabled anchors and tags on a field of play, e.g., a basketball court. Tags are attached to the players and the ball(s) or other game-play objects. The system determines and evaluates the location in space of each of the tags. The system evaluates the proximity of players and tags associated with game-play objects to assess whether a given player is in possession of the game-play object. If the game-play-object tag is not sufficiently close to a player for the player to be in possession of the object, then the position of the game-play object is evaluated to determine whether it is in a goal zone region, which is a predefined, limited region in space surrounding the actual goal (e.g., basketball hoop in the case of basketball). If so, and if the game-play object has been within an attempt zone (i.e., a sub-zone within the goal zone region), then the system determines whether a goal has been made by evaluating whether the game-play object passed in order through a number of sub-regions before, at, and after the actual goal. In this manner, accuracy of the determination as to whether a goal has been scored is improved.

In the context of the invention, the sub-region before the actual goal is the region of space immediately preceding the actual goal, i.e., above the hoop for basketball or in front of the goal for soccer or hockey. In other words, it is a region of space through which the game-play object must pass in order to enter the goal, and it may extend right up to the plane of the goal. The sub-region at the actual goal is a region in space that may be coextensive with the space occupied by the actual goal, or it may be slightly wider than the actual goal (taken in a direction orthogonal to the plane of the goal). The sub-region after the actual goal is a region in space which follows the sub-region at the goal, taken in the direction orthogonal to the plane of the goal and following the sub-region at the goal in the sense that a game-play object will pass through the sub-region after the goal after the game-play object has passed through the sub-region at the goal (in terms of time progression). Thus, for basketball, the sub-region after the goal will be below the hoop, whereas it will be behind the rectangular goal posts for hockey or soccer.

Thus, in one aspect, the invention features a method for determining that a player has scored a goal in a sporting activity. Each of the players participating in the sporting activity has a remotely identifiable player tag associated with him or her, e.g., worn on his or her body, and a game-play object, such as a basketball, has a remotely identifiable object tag associated with it. The method includes identifying the position in three-dimensional space of each of the players and the game-play object by means of their associated tags; and using the identified positions of the players and the game-play object to evaluate the proximity of the game-play object to the players so as to assess whether any of the players is in possession of the game-play object. If no player is sufficiently close to the game-play object to be in possession of the game-play object, then the system next determines whether the game-play object is in a goal zone region. The goal zone region is a predefined, limited region in space surrounding the goal. If the game-play object is determined to be in the goal zone region, then the system evaluates whether the game-play object was previously within an attempt zone. The attempt zone is a smaller predefined, limited region in space within the goal zone region, which also surrounds the goal. If the game-play object is determined to be in the goal zone region and to have previously been within the attempt zone, then the system determines whether the game-play object passed in order through a number of predefined discrete sub-regions before, at, and after the actual goal, as these sub-regions are explained above. If it has, then the fact that a player has scored a goal can be indicated.

In embodiments of the inventive method, the last player to have been in possession of the game-play object is indicated to be the player that has scored the goal.

Furthermore, one region in space surrounding a potential player in possession of the game-play object can be used to evaluate proximity of the game-play object to the players to assess whether any of the players has putatively gained possession of the game-play object, with another, larger region in space surrounding a player who has been determined to be in possession of the game-play object being used to evaluate proximity of the game-play object to the player who has been determined to be in possession of the game-play object, for purposes of assessing whether the player who has been determined to be in possession of the game-play object is still in possession of the game-play object. The larger region in space may be larger in terms of horizontal distance within which possession is determined to exist; the vertical distance within which possession is determined to exist; or both.

Further still, in embodiments of the inventive method, assessment of whether any of the players is in possession of the game-play object can include assessing how long the game-play object is within a predefined region in space around a player who has been identified as putatively in possession of the game-play object; it can be based on identifying the player who is closest to the game-play object as the player who is (putatively) in possession of the game-play object; and it can include making sure that the game-play object is located less than predefined vertical and/or horizontal distances away from the player that possession of the game-play object would not be possible.

In the case of multiple goals being present in the field of play, embodiments of the method can include evaluating whether the game-play object is in a goal zone region surrounding each of the goals, to identify the particular goal zone that should be evaluated for whether a goal has been made.

In another aspect, the invention features a system for tracking players and a game-play object on a field of play and for determining whether a goal has been scored. The system includes a plurality of player tags and an object tag, as well as a plurality of sensors which are able to remotely detect the player tags and the object tag. The system further includes a computing device having a processor and non-transitory program instructions contained in computer memory thereof. The program instructions are configured to execute the method steps described above, with specific embodiments of the system implementing the various method steps described above with respect to specific embodiments of the inventive method.

The inventive method and system enable highly accurate, wireless tracking of the location of players and balls or other game-play objects on a field of play, with highly precise determination as to whether a player has scored a goal. This enhances the ability of players and/or coaches to monitor and evaluate the players' performances, as well as the enjoyment of fans who may be watching the players play.

BRIEF DESCRIPTION OF THE DRAWINGS

These and other features of the invention will become clearer from the detailed description below as well as the drawings, in which:

FIG. 16 shows a schematic diagram illustrating some of the information that could be transmitted in each type of data transmission packet in one implementation of the present invention.

DETAILED DESCRIPTION OF EMBODIMENTS OF THE INVENTION

Figure 1A:
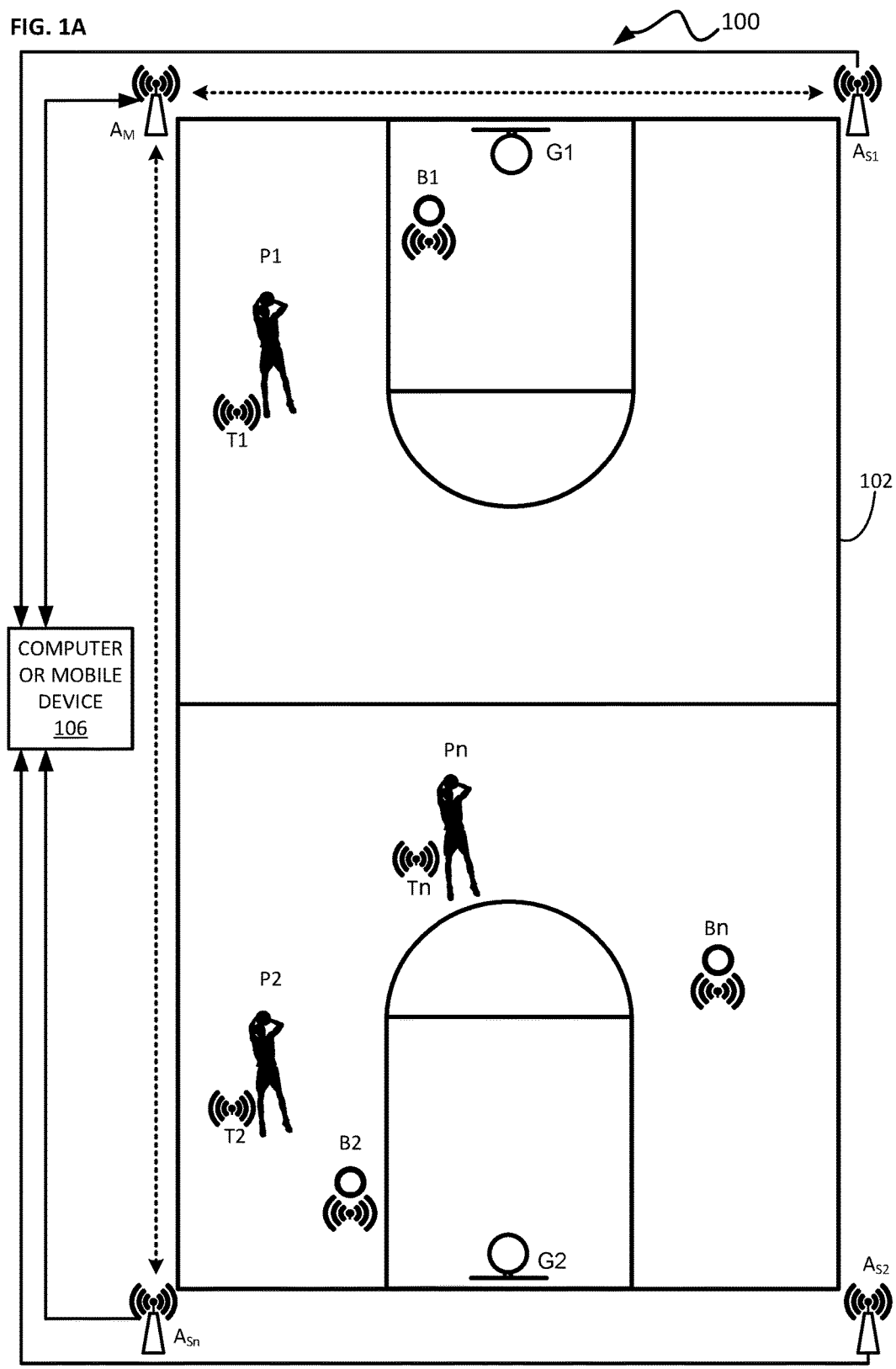
FIGS. 1A and 1B are a schematic plan view and side view, respectively, illustrating a location-and-event-tracking installation (at a basketball court) for practicing the invention.
Figure 1B:
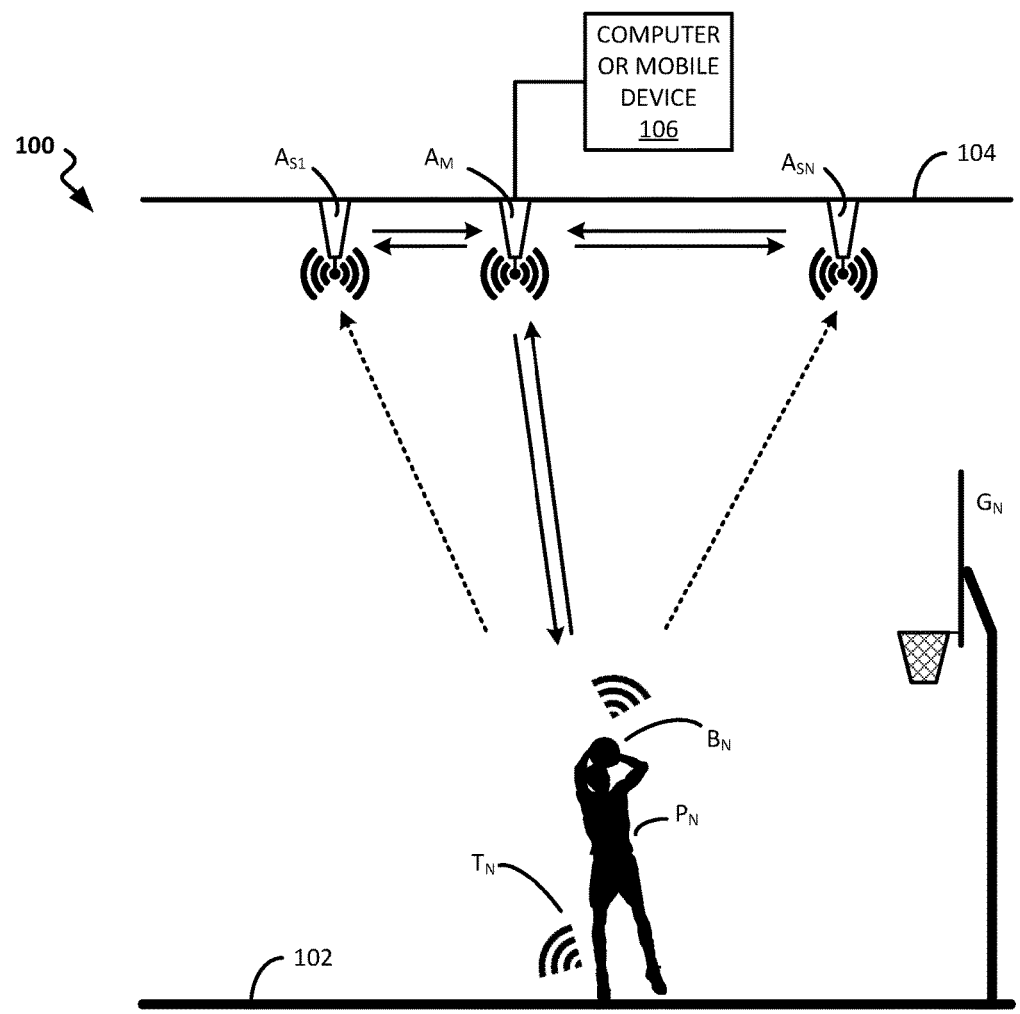

An installation 100 for practicing the invention is illustrated in FIGS. 1A and 1B. The installation 100 is implemented, in this case, at a basketball facility that has a playing area (e.g., a basketball court 102) and one or more goals (e.g., basketball hoops/baskets) $G_1, G_2, \ldots G_n$ located at various positions around the court 102, although the invention could also be implemented in connection with other sports such as hockey, baseball, football, etc., where the goals could be the hockey net, baseball bases, the football endzone line, etc. One or more players $P_1, P_2, \ldots P_n$ participate in the sporting event, which could entail multiple players practicing at the same time, as illustrated in FIG. 1A; just a single player practicing by himself or herself, as illustrated in FIG. 1B; or an actual game (not illustrated).

As further illustrated in FIGS. 1A and 1B, a number of ultra-wide-band (UWB) radio-enabled "anchors" are located around the playing area. The anchors include a "master" anchor $A_M$ and a number of "slave" anchors $A_{A1}, A_{S2}, \ldots A_{Sn}$ positioned at multiple known locations around the playing area. The various anchors could be located at approximately the same level as the players, e.g., by being mounted on pylons or stands that are supported on the court 102, or they could be located above the field of play, e.g., in the rafters 104 at the sporting facility as illustrated in FIG. 1B.

Additionally, each of the players $P_1, P_2, \ldots P_n$ wears a UWB radio-enabled tag $T_1, T_2, \ldots T_n$, respectively, and each of the basketballs (generically referred to as "game-play objects") being used on the court at a given time has a similar UWB radio-enabled tag $B_1, B_2, \ldots B_n$ located either inside of it or on a surface of it. The various anchors communicate bi-directionally with the various tags and with each other and, using an associated location-and-eventtracking application running on a connected computer, mobile device (smartphone, tablet, laptop computer, etc.), or remote server (i.e., a "connected computing device") 106, the system is able to identify the location of each of the tags in three-dimensional space. Therefore, because each of the tags is assigned in the system to a player or a ball, the system is able to determine the location in three-dimensional space of each of the players and balls.

Regarding the computing device 106, it may be connected to the system of anchors by an Ethernet connection, a USB connection, Wi-Fi, the Internet, or any other suitable mechanism that permits signals to be transmitted between the computing device 106 and the system of anchors. Additionally, in alternative embodiments, the location-and-event-tracking application may be stored and executed on one of the various anchors, e.g., the master anchor $A_M$.

Such a system of anchors and tags could, for example, be a DWUSB system (http://www.ciholas.com/dwusb), which can be configured to use two-way radio ranging to monitor and track the location and movements of the various basketball players $P_1, P_2, \ldots P_n$ and the ball(s) $B_1, B_2, \ldots B_n$ on the basketball court 102, and which is commercially available from Ciholas Inc. in Newburgh, Ind. Additionally, we have further developed the DWUSB system, to better coordinate data communications between the various tags and anchors in the system. Particulars of how we have done so are explained in the section entitled "Coordination of Data Communications between Tags and Anchors," located at the end of this Detailed Description.

The system of anchors determines where the various tags are located relative to the various anchors. However, as noted above, the anchors are positioned at precisely known (i.e., surveyed) positions relative to the playing field. Therefore, using a straightforward transform, the system—in particular, a tracking application this is running on the connected computing device 106—is able to determine where the various tags, and hence the players $P_1, P_2, \ldots P_3$ and balls $B_1, B_2, \ldots B_3$, are located relative to the playing field.

Figure 2:
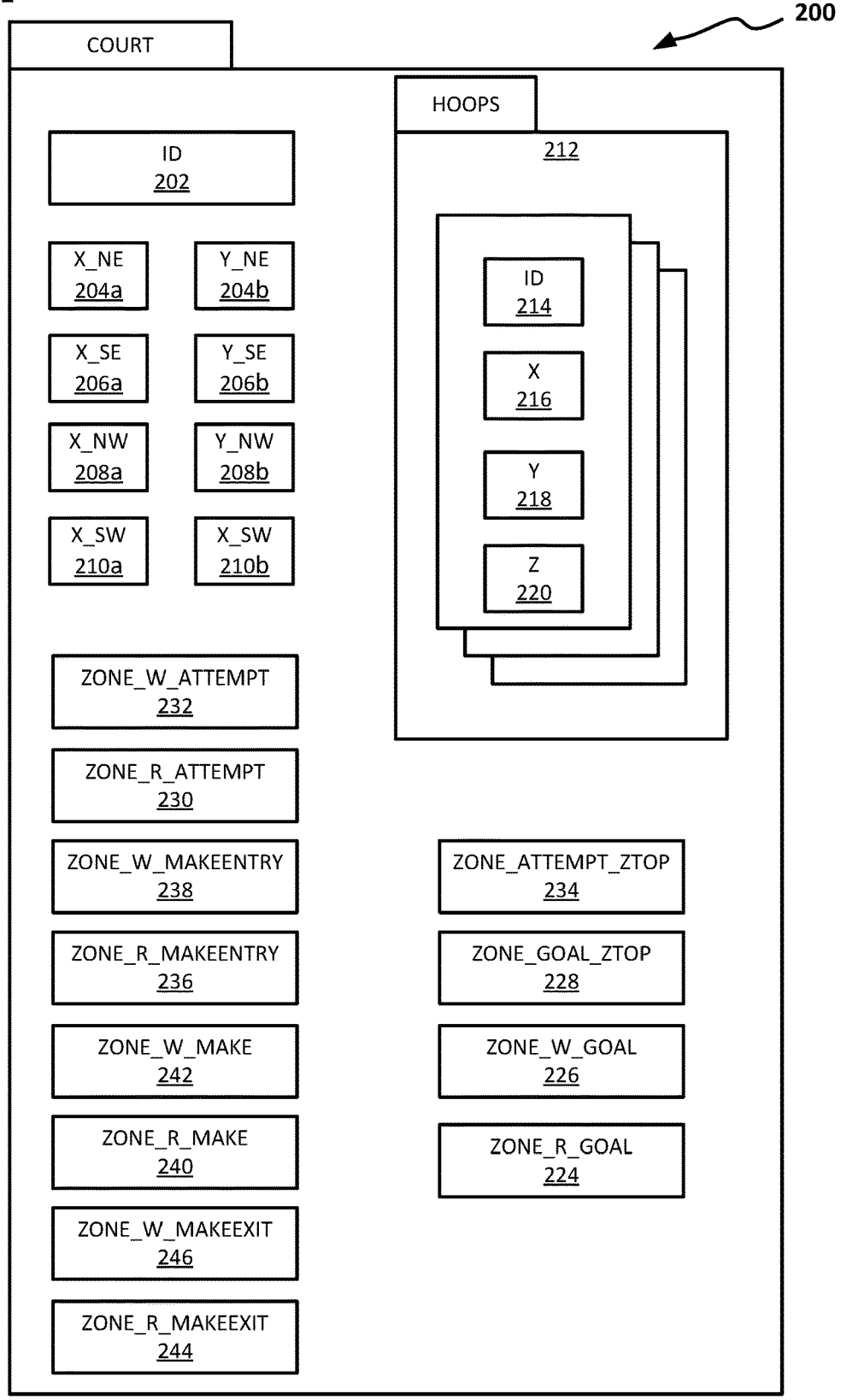
FIG. 2 is a diagram illustrating parameters of an object-oriented data structure representing a basketball court in accordance with the invention.
Figure 4:
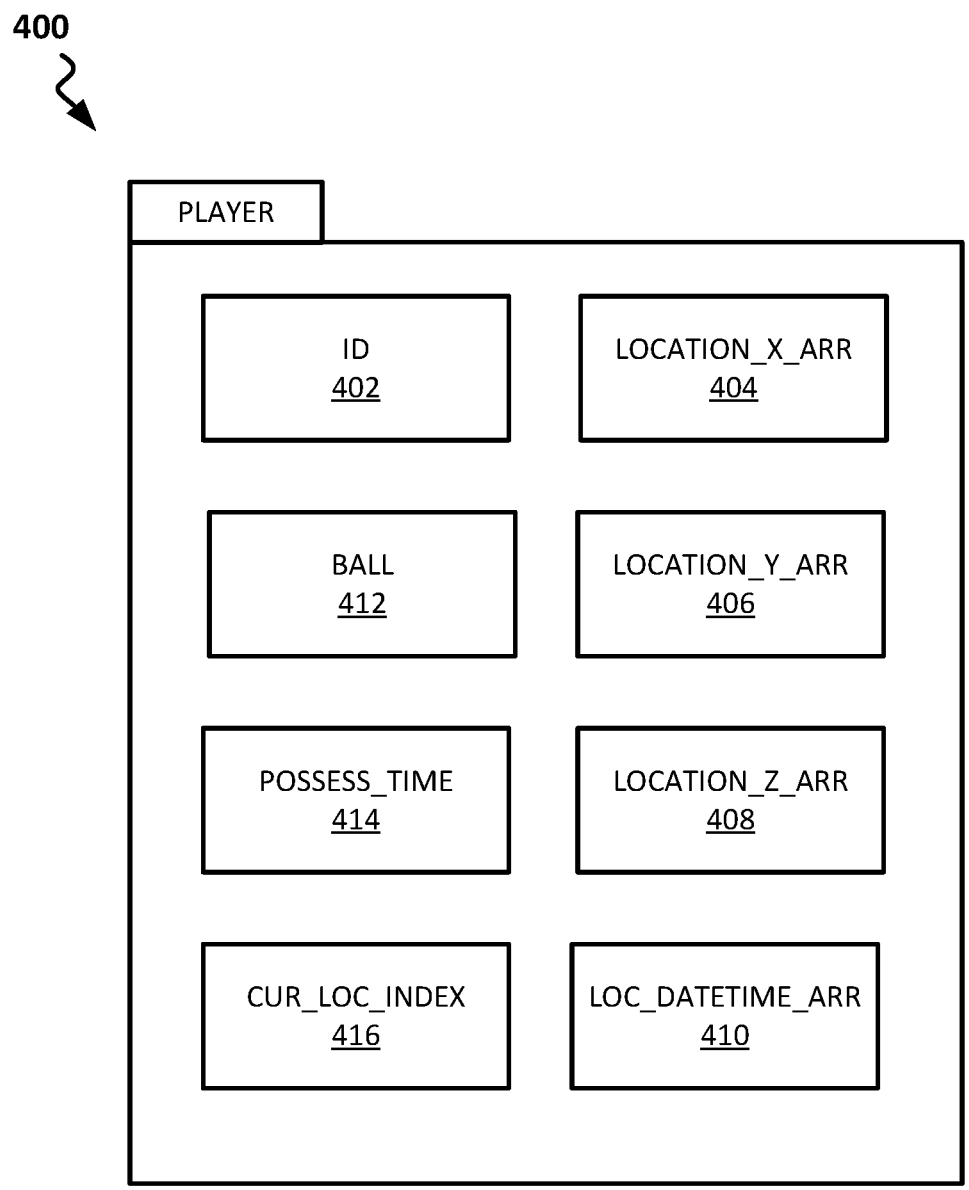
FIG. 4 is a diagram illustrating parameters of an object-oriented data structure representing a basketball player in accordance with the invention.
Figure 5:
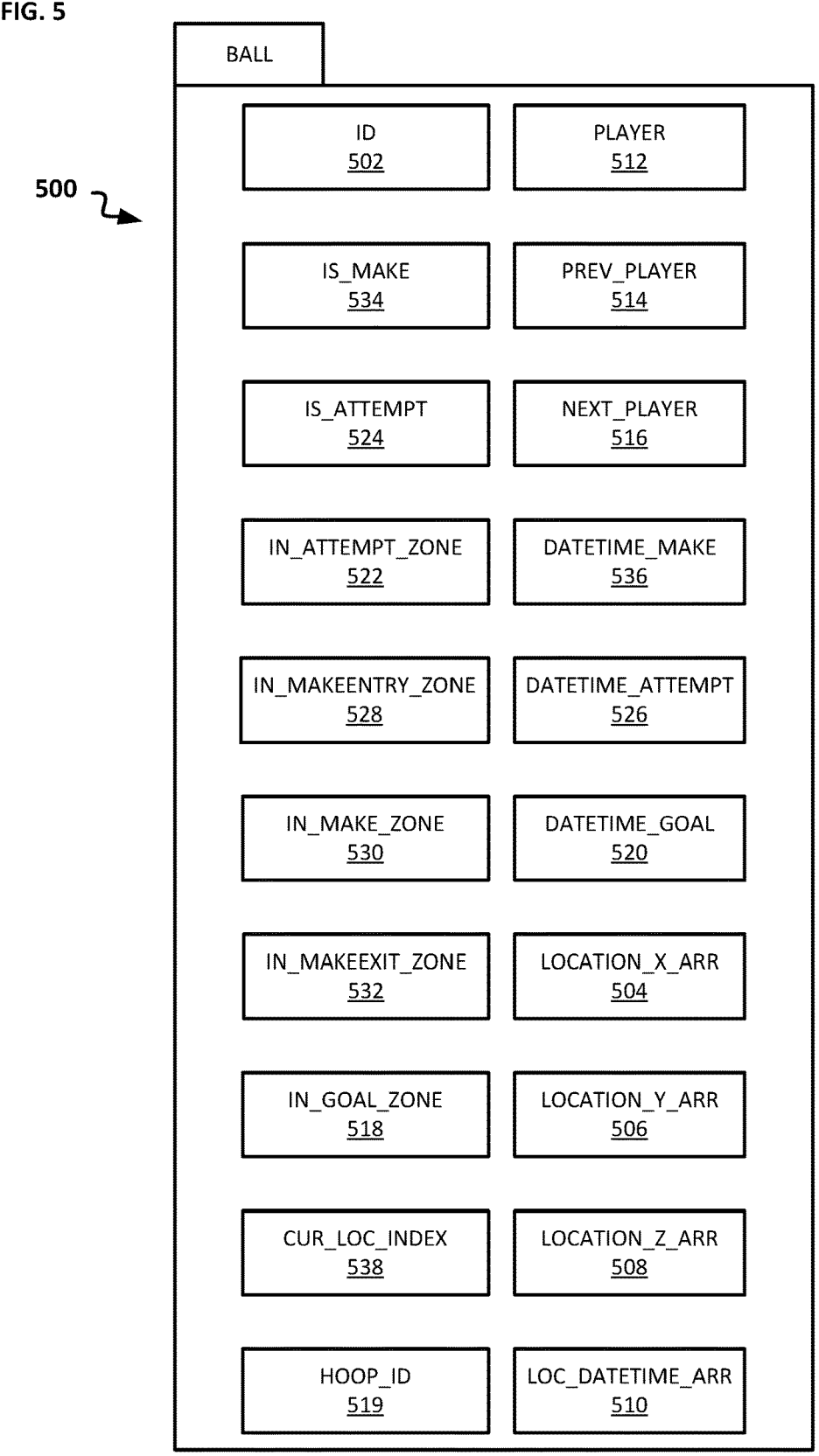
FIG. 5 is a diagram illustrating parameters of an object-oriented data structure representing a basketball in accordance with the invention.
Figure 6:
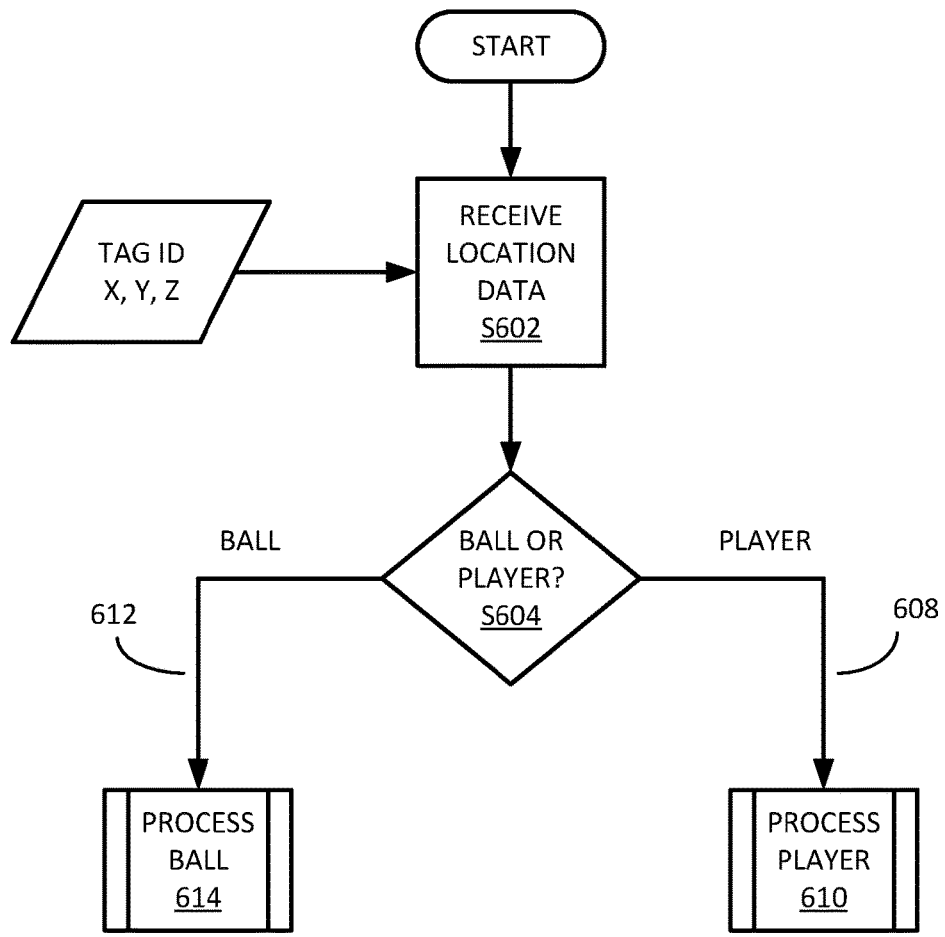
FIG. 6 is a high-level flow diagram illustrating processing of tag-location data in accordance with the invention.

Pertinent information regarding the playing field, the players, and the balls (i.e., game-play objects) is stored in various object-oriented data structures 200, 400, and 500, as illustrated in FIGS. 2, 4, and 5. Suitably, the data structures 200, 400, and 500 are located in memory in the computing device 106 on which the location-and-event-tracking application resides and is executed. It is feasible, however, for the data structures 200, 400, and 500 to be located elsewhere, e.g. on a remote server, with the application retrieving data from and storing data to the data structures, as necessary, by establishing remote connections to the remote server using networks and technologies well known in the computer networking field.

As illustrated in FIG. 2, object-oriented data structure 200 represents the playing field, e.g., the basketball court. For a given court, the data structure 200 includes an identification number 202 for the court, as well as X, and Y coordinates 204a, 204b, 206a, 206b, 208a, 208b, 210a, and 210b for each of the four corners of the court. To simplify calculation, it may be desirable for one of the corners of the court to have X, and Y coordinates of 0,0, with the remaining corners having X, and Y coordinates of $X_{max}$,0; $X_{max}$, $Y_{max}$; and 0, $Y_{max}$, which "places" all positions on the court into the first, completely positive quadrant of a Cartesian coordinate system. Alternatively, the court could be configured in the data structure 200 with the origin 0,0 being located in the very middle of the court.

In addition to the court corner locations, the court data structure 200 includes an array 212 of hoop data. For each hoop associated with the court, the array 212 includes a hoop identification number 214 along with the X, Y, and Z coordinates of the center of the hoop in location data fields 216, 218, and 220, respectively.

Figure 3:
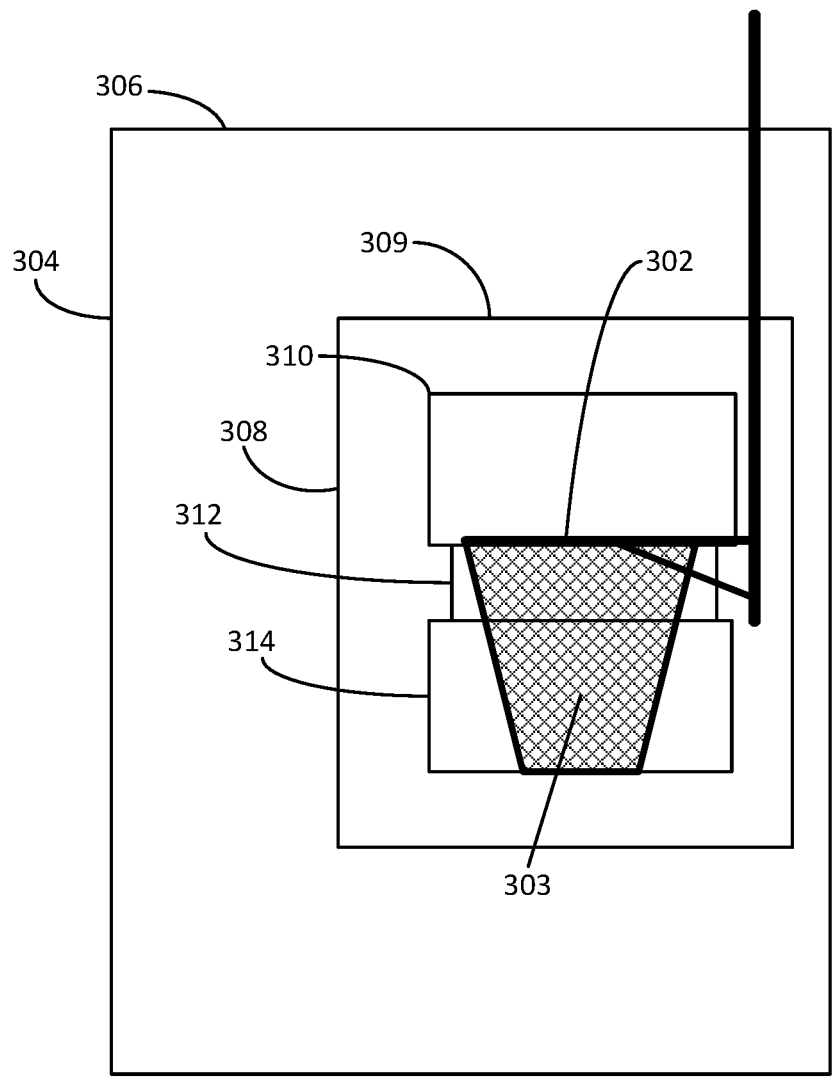
FIG. 3 is a side view illustrating various zones around a basketball hoop in accordance with the invention.

Furthermore, the court data structure 200 includes data for a number of parameters that define various regions in space surrounding each of the hoops, which parameters enable the location-and-event-tracking application to identify attempted baskets (goals); attempted baskets that have been made successfully; and attempted baskets that have not been made successfully, as addressed more fully below. In particular, as illustrated in FIG. 3, a number of regions in space are defined around, above, and below the hoop 302. (FIG. 3 shows the hoop 302 and net 303 in profile.) These regions in space include an overall goal zone 304, which is a cylindrical region that has a central, longitudinal axis (not illustrated) that passes through the X-Y center of the hoop 302. The radius R of the goal zone 304 is set in the ZONE_R_GOAL data field 224, and the vertical extent (width) W of the goal zone 304 is set in the ZONE_W_GOAL data field 226. (The size and geometry of the area around the goal may vary by sport—for example, a hockey goal is generally rectangular—and may be configurable by the users of the system.) Additionally, because the goal zone 304 typically is not centered vertically relative to the hoop 302, the upper boundary 306 of the goal zone 304 is set in the ZONE_GOAL_ZTOP data field 228, which is the vertical (i.e., Z axis) location of the top of the goal zone 304. When it is determined that a ball has entered the goal zone 304, the location-and-event-tracking application performs a routine that tracks the position and trajectory of the ball through space with high precision to determine whether a basket has been made, as addressed more fully below.

In addition to the goal zone 304, an attempt zone 308, a "make" entry zone 310, a "make" zone 312, and a "make" exit zone 314 are also defined surrounding, immediately above, immediately at, and immediately below the hoop 302, respectively, as illustrated in FIG. 3. Like the goal zone 304, the attempt zone 308 is a cylindrical region that has a central, longitudinal axis (not illustrated) that passes through the X-Y center of the hoop 302. The radius R of the attempt zone 308 is set in the ZONE_R_ATTEMPT data field 230, and the vertical extent (width) W of the attempt zone 308 is set in the ZONE_W_ATTEMPT data field 232. Additionally, because the attempt zone 308 typically is not centered vertically relative to the hoop 302, the upper boundary of the attempt zone 308 is set in the ZONE_ATTEMPT_ZTOP data field 234, which is the vertical (i.e., Z axis) location of the top 309 of the attempt zone 308.

As for the make entry, make, and make exit zones 310, 312, and 314, they, too, are cylindrical regions, with each having a central, longitudinal axis (not illustrated) that passes through the X-Y center of the hoop 302. The make entry zone 310 "sits" right on top of the hoop 302, with its bottom boundary coincident with the vertical position of the hoop 302 as specified in the hoop Z location data field 220. The make entry zone 310 has a radius R, which is slightly larger than the radius of the hoop 302 that is set in the ZONE_R_MAKEENTRY data field 236 and a vertical extent (width) W that is set in the ZONE_W_MAKEENTRY data field 238. The make zone 312 "sits" right under the hoop 302, with its upper boundary coincident with the vertical position of the hoop 302 as specified in the hoop Z location data field 220. The make zone 312 has a radius R, which is essentially the same as the radius of the hoop 302, that is set in the ZONE_R_MAKE data field 240 and a vertical extent (width) W that is set in ZONE_W_MAKE data field 242. The make exit zone 314 "sits" right under the make zone 312, with its upper boundary coincident with the lower boundary of the make zone 312. The make exit zone 314 has a radius R, which is also slightly larger than the radius of the hoop 302, that is set in the ZONE_R_MAKE-EXIT data field 244 and a vertical extent (width) W that is set in the ZONE_W_MAKEEXIT data field 246. (The radius of the make entry zone 310 and the radius of the make exit zone 314 are larger than the radius of the hoop 302/make zone 312 to account for the fact that balls frequently enter and exit the hoop 302 at an angle relative to vertical.)

As illustrated in FIG. 4, object-oriented data structure 400 includes, for each player that is in the field of play, a player-identifying ID data field 402. As noted above, each player wears a radio tag. Thus, the data in the ID data field 402 is essentially a tag identification number for the tag that each player is wearing. Additionally, the data structure 400 includes, for each player in the field of play, historic information as to the player's X location in the LOCATION_X_ARR array (or ring buffer) 404; Y location in the LOCATION_Y_ARR array (or ring buffer) 406; and Z location in the LOCATION_Z_ARR array (or ring buffer) 408. As addressed more fully below, the X, Y, and Z location values are entered into their respective arrays (or buffers) after smoothing, e.g., by means of a 10-point moving average. Date and time data corresponding to each players' location are stored in a LOC_DATETIME_ARR array 410.

Furthermore, the data structure 400 includes fields pertaining to whether a given player is in possession of a basketball. (Determination of this state is addressed below.) In particular, the BALL data field 412 contains the tag ID information for a ball that is determined to be in the player's possession, as addressed below, and the POSSESS_TIME data field 414 contains data indicating the length of time for which the player is in possession of the ball or is putatively in possession of the ball (addressed more fully below). Further still, the CUR_LOC_INDEX data field 416 is used to keep track of array index locations as the player's location data is processed, as described below.

As illustrated in FIG. 5, object-oriented data structure 500 includes, for each ball that may be in the field of play, a ball-identifying ID data field 502. As noted above, each ball has a radio tag on it or embedded inside it. Thus, the data in the ID data field 502 is essentially a tag identification number for the tag that each ball has associated with it. Additionally, the data structure 500 includes, for each ball in the field of play, historic information as to the ball's X location in the LOCATION_X_ARR array (or ring buffer) 504; Y location in the LOCATION_Y_ARR array (or ring buffer) 506; and Z location in the LOCATION_Z_ARR array (or ring buffer) 508. As addressed more fully below, the X, Y, and Z location values are entered into their respective arrays (or buffers) after smoothing, e.g., by means of a 10-point moving average. Date and time data corresponding to each of the ball's locations is stored in a LOC_DATETIME_ARR array 510.

Data structure 500 further includes a PLAYER data field 512, which identifies a particular player in possession of the ball, as well as a previous-player data field PREV_PLAYER 514 to keep track of the player who last had possession of the ball. The PREV_PLAYER data field 514 is used because no player will be in possession of the ball while it is travelling through the air, e.g., during a shot attempt or as it is being passed, during which period of time the player-in-possession PLAYER data field 512 will be cleared. Therefore, maintaining the previous-player-in-possession information in the PREV_PLAYER data field 514 allows the system to keep track of who took a shot, who passed the ball to the next player, or who had the ball stolen away. Additionally, data structure 500 includes a next-player data field NEXT_PLAYER 516, which identifies a player who is close enough to the ball that he or she might be assigned as having the ball once he or she is determined to be close enough to the ball for a minimum required possession time, as addressed more fully below.

Additional fields in the data structure 500 relate to the determination of whether a basketball shot has been taken and, if so, whether the shot has been made successfully. These fields include an IN_GOAL_ZONE data field 518, which includes a flag that indicates whether the ball has entered the goal zone 306, and a DATETIME_GOAL data field, which identifies when the ball entered the goal zone for historical, tracking purposes. Additionally, the HOOP_ID data field 519 identifies the particular hoop (by hoop ID 214) associated with the goal zone that the ball has entered, if any. Data field IN_ATTEMPT_ZONE 522 includes a flag that indicates whether the ball has entered the attempt zone 308, and data field IS_ATTEMPT 524 includes a flag that indicates whether the ball has entered the attempt zone 308 by virtue of a shot actually having been taken (i.e., a basket having been attempted) instead of happenstance. Data field DATETIME_ATTEMPT 526 includes information identifying the date and time when the ball enters the attempt zone 308, for historical, tracking purposes.

Data fields IN_MAKEENTRY_ZONE 528, IN_MAKE_ZONE 530, and IN_MAKEEXIT_ZONE 532 include flags that indicate, respectively, whether the ball is successively in the make entry zone 310, the make zone 312, and the make exit zone 314. If it is determined that the ball has passed through all three zones (as addressed below) and it is concluded that a shot has been made successfully, then a flag will be stored in the IS_MAKE data field 534 so indicating, and the date and time of the made shot will be stored in the DATETIME_MAKE data field 536 for historical, tracking purposes. Further still, the CUR_LOC_INDEX data field 538 is used to keep track of array index locations as the ball's location data is processed, as described below.

In general, the location-and-event-tracking application preferably keeps track of the locations of players and balls on the court using a sampling rate of at least 100 Hz, and also tracks each player's shot attempts, made shots, ball possessions, and other motion information for real-time display and long-term analysis. This data may be made available for long-term analysis and other near-real-time data processing and display by saving all data to the cloud, where it is available to a much larger range of devices, including fan-based applications.

Operation of the location-and-event-tracking application is illustrated in FIGS. 6-12. As illustrated in the high-level flow diagram 600 of the location-and-event-tracking application shown in FIG. 6, the process implemented by the application begins by receiving the X, Y, and Z coordinates of all of the player-associated and ball-associated tags in the field of play, along with associated tag IDs (S602). The application then determines (at step S604) whether the data received for each tag represents a ball or a player by comparing the received tag ID to previously known or configured tag IDs. If the tag is associated with a player (result path 608), the program passes the location data to a PROCESS PLAYER module 610 for further processing as described in the next two paragraphs and illustrated by the flow diagram shown in FIG. 7. If the tag is associated with a ball (result path 612), the program passes the location data to a PROCESS BALL module 614 for further processing, as described farther below.

Figure 7:
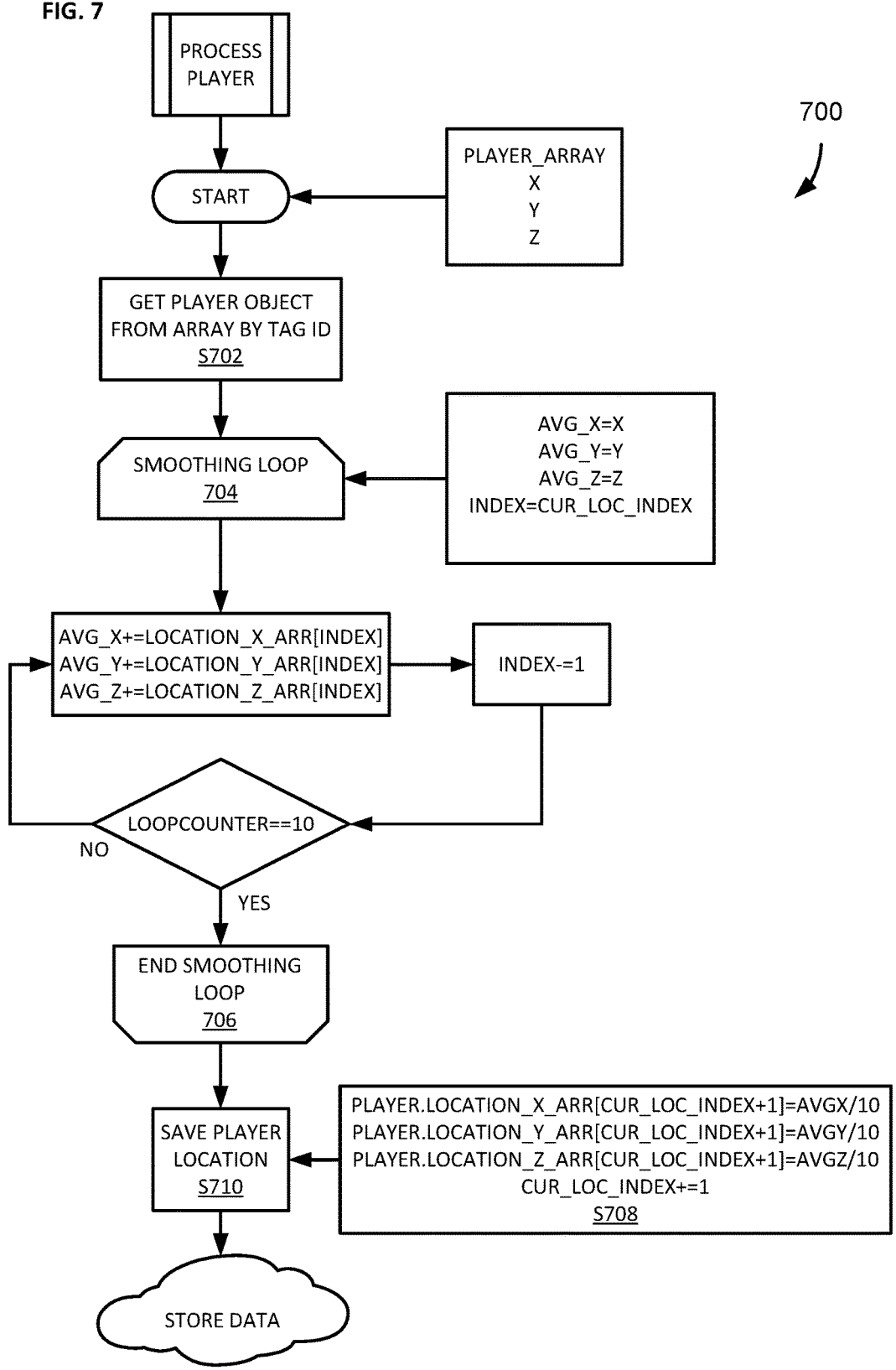
FIG. 7 is a flow diagram illustrating processing of tag-location data that is associated with a player in accordance with the invention.
Figure 8A:
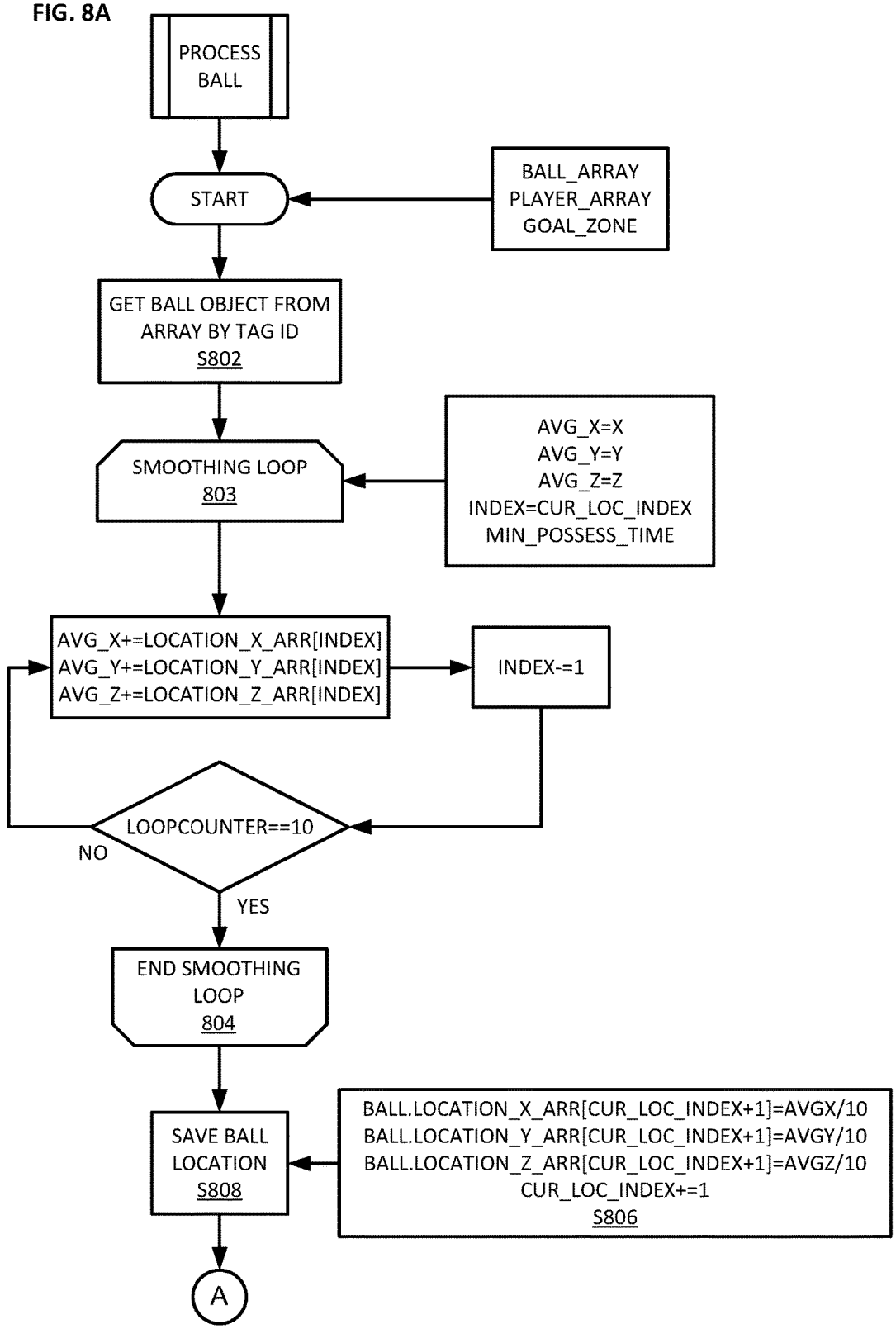
FIGS. 8A and 8B are a flow diagram illustrating processing of tag-location data that is associated with a ball in accordance with the invention.
Figure 8B:
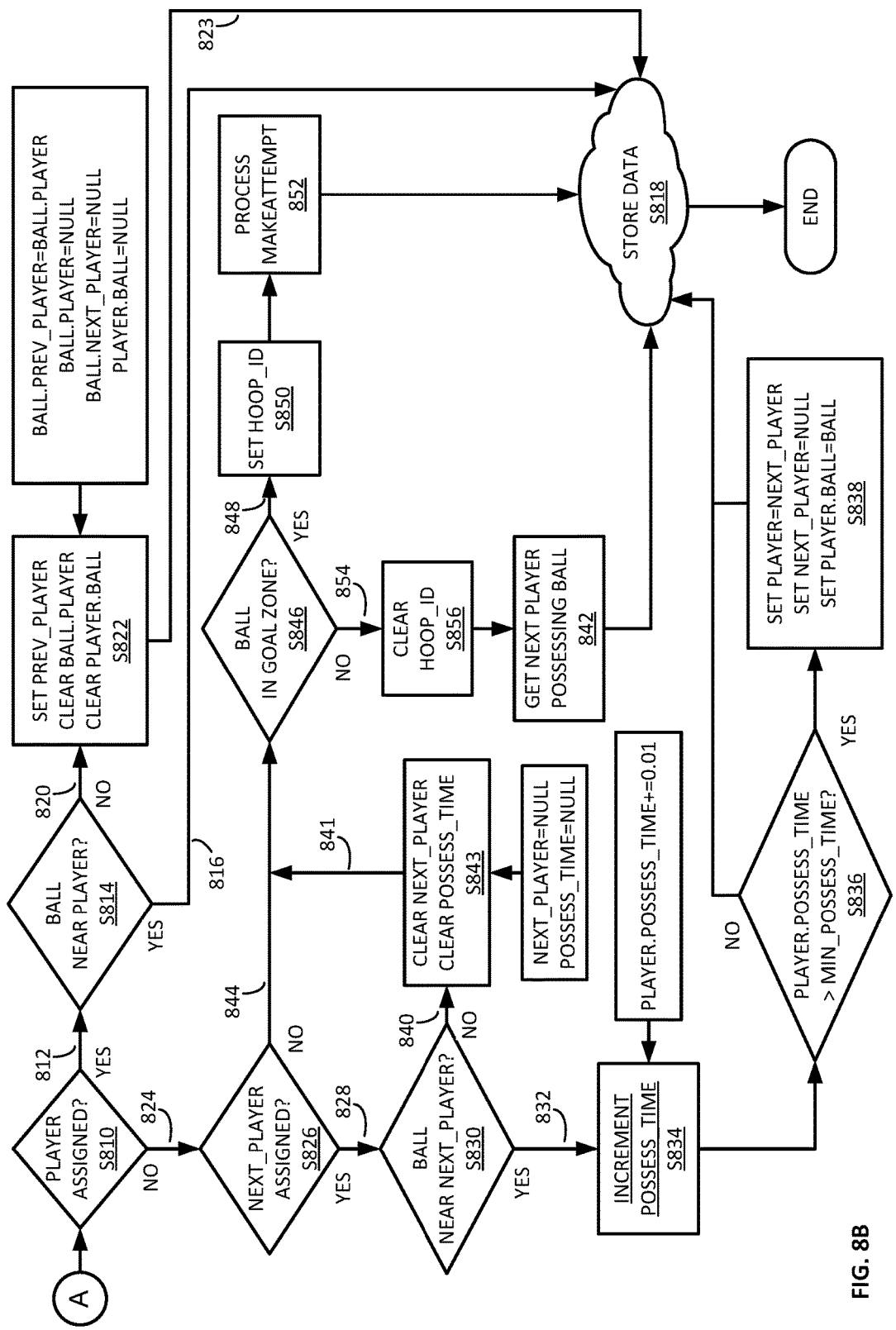

FIG. 7 contains a flow diagram 700, which illustrates the operation of the PROCESS PLAYER module 610. As shown in FIG. 7, player-processing begins at step S702 by retrieving from an internal array, based on the ID data field 402, the object representing the particular player being analyzed, with the player's X, Y, and Z locations at each point in time being stored in the LOCATION_X_ARR array 404, the LOCATION_Y_ARR array 406, and the LOCATION_Z_ARR array 408, respectively. For each point in time, the program stores a ten-data-point moving average using the player's X, Y, and Z location values for the given point in time and the nine preceding points in time. Thus, the smoothing loop with endpoints 704 and 706 is executed ten times, starting with the index for the current point in time and "working backward," to sum the player's location data values for the current point in time and the nine preceding points in time. The average value for each of the X, Y, and Z locations is determined by dividing the summed value by ten (S708), and the averaged value for each of the player's X, Y, and Z locations is then stored (S710) in memory.

On the other hand, if the location information received at step S602 is associated with a ball (result path 612), then the program passes the location data to the PROCESS BALL module 614 as noted above. As illustrated in the flow diagram 800 for the PROCESS BALL module 614 (FIGS. 8A and 8B), ball-processing begins by retrieving (S802) from an internal array, based on the ID data field 502, the object representing the particular ball being analyzed, with the ball's X, Y, and Z locations at each point in time being stored in the LOCATION_X_ARR array 504, the LOCATION_Y_ARR array 506, and the LOCATION_Z_ARR array 508, respectively. For each point in time, the program stores a ten-data-point moving average using the ball's X, Y, and Z location values for the given point in time and the nine preceding points in time. Thus, the smoothing loop with endpoints 803 and 804 is executed ten times, starting with the index for the current point in time and "working backward," to sum the ball's location data values for the current point in time and the nine preceding points in time. The average value for each of the X, Y, and Z locations is determined by dividing the summed value by ten (S806), and the averaged value for each of the ball's X, Y, and Z locations is then stored (S808).

Next, the ball object is evaluated (S810) to see if it already has been assigned to a player by checking whether the PLAYER property 512 associated with the ball object has a value. If the PLAYER property 512 has a value (result path 812), then this indicates either that a player has possession of the ball, or has just recently had possession of the ball (i.e., at the previous iteration of the overall program loop) but has given it up (e.g., by passing the ball, attempting to make a basket, or having had the ball stolen away from him or her). Therefore, if a player is assigned to the ball object, the system checks (S814) to see whether the ball is still near the associated player, so as to distinguish between the player still having possession of the ball and the player having just terminated possession of the ball.

Figure 9A:
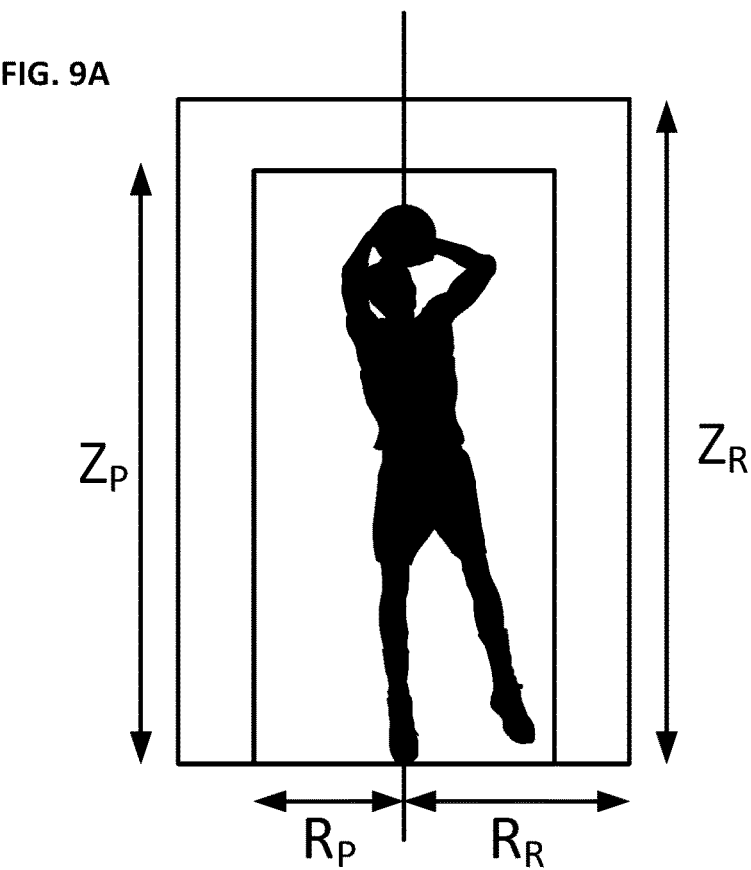
FIGS. 9A and 9B are a side view and a plan view, respectively, illustrating a ball-possession-gaining zone and a ball-possession-retaining zone around a player.
Figure 9B:
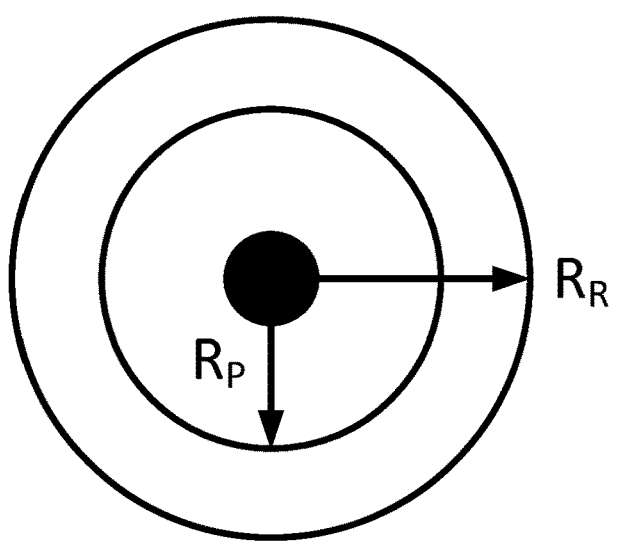

In this regard, as illustrated in FIGS. 9A and 9B, the zone around a given player in which the player may be considered to be gaining possession of the ball (subscript "P" in the figures) is slightly smaller than the zone around the player in which the player will be considered to be retaining possession of the ball (subscript "R" in the figures), given that a player will typically pull the ball in close to their body when receiving the ball, then may move the ball farther away from their body as they attempt to pass, shoot, or hold the ball away from an opposing player. Thus, the horizontal radius of the receiving-possession zone $R_P$ around the player is smaller than the horizontal radius of the retaining-possession zone $R_R$ around the player. Similarly, the height of the receiving-possession zone $Z_P$ is less than the height of the retaining-possession zone $Z_R$. (The acceptable ranges of horizontal radius and height for a ball to be near a player may be configurable parameters that vary by sport and age group of players using the system. In some embodiments for basketball, examples of acceptable ranges are 4 feet in radius and 8 feet in height.)

Therefore, to determine whether the ball is still near the associated player (S814), the system determines how far away from the associated player the ball is in the horizontal direction by calculating the square root of the sum of the squares of the difference between the ball's and the player's X coordinates and the difference between the ball's and the player's Y coordinates (SQRT($(X_{ball}-X_{player})^2+(Y_{ball}-Y_{player})^2$)). If the horizontal distance between the ball and the associated player is less than or equal to the larger, retaining-possession radius $R_R$, and the Z coordinate of the ball is less than or equal to the larger Z value of the retaining-possession zone height $Z_R$, then the previously associated player will be considered to be still in possession of the ball (result path 816), and the system stores the location of the ball (S818) locally or to a server in the cloud for long term storage and distribution to connected applications.

If it is determined (S814) that the ball is not near the previously associated player (result path 820), then the association between the ball and the player is cleared at S822 (PLAYER attribute 512 of the ball object and BALL attribute 412 of the player object are both nullified) on the assumption that the player has passed the ball, shot the ball, or had the ball stolen away, and the process returns (return path 823). Additionally, before nullifying the association, the PREV_PLAYER data field 514 will be set to the identity of the player who has just had and lost possession of the ball. Furthermore, to prepare the data registers to identify the next player that comes into possession of the ball, the next-player data field NEXT_PLAYER 516 is also cleared.

If, on the other hand, the result of the evaluation S810 to see whether the ball is associated with a player is negative (result path 824), the system checks (S826) to see whether a value has been assigned to the next-player data field NEXT_PLAYER 516, which will be the case if possession processing (described shortly below) has identified a player that is close enough to the ball to at least possibly be the next player to take possession of the ball. (The next-player that is so identified will not be associated with the ball as actually having possession until a predetermined amount of time has elapsed, as detailed below.) If a next-player value has, in fact, been assigned to the ball in the next-player data field NEXT_PLAYER 516 (result path 828), the system will check (S830) to see whether the ball is near enough to the next player to "hold" the next player as potentially the next player to take actual possession of the ball.

For this evaluation (S830), the system uses the radius and height dimensions of the smaller, gaining-possession zone around a player illustrated in FIGS. 9A and 9B. Thus, the system checks to see whether the horizontal distance between the ball and the identified next player (SQRT($(X_{ball}-X_{next-player})^2+(Y_{ball}-Y_{next-player})^2$)) is less than or equal to the smaller, gaining-possession radius $R_P$ and the Z coordinate of the ball is less than or equal to the smaller Z value of the gaining-possession zone height $Z_P$. If the ball is, in fact, near enough to the next player to satisfy these conditions (result path 832), then the system counts how long the ball is near the next player, i.e., by incrementing (S834) the possession time data field POSSESS_TIME 414 for the next player by the amount of time between successive iterations of the processing loop, e.g., 0.01 seconds for the case where the system executes at a rate of 100 Hz. So long as the next player maintains possession of the ball within the receiving-possession zone, another increment of time will be added (S834) to the accumulated possession time data field POSSESS_TIME 414 for the next player each time the overall process is implemented, until it is determined (S836) that the accumulated possession time exceeds the predetermined minimum amount of possession time (e.g., on the order of one-half to one second, which may be set depending on the skill level of the players in connection with whom it is expected the system will be used). When this happens, the player that has been being "held" as the putative next player is assigned to be the player who is actually in possession of the ball. In particular, the player data field PLAYER 512 associated with the ball object is given the player ID value 402 of the player who has been the next player (S838), and the ball data field BALL 412 associated with the object for the player who was being held as the next player—now the player actually in possession of the ball—is given the ball ID value 502 of the ball to indicate that that player now has possession of the ball. Additionally, the next-player data field NEXT_PLAYER 516, which has "served its purpose," is cleared.

If, on the other hand, the ball is not (yet) within the gaining-possession zone around the next player (result path 840 from determination S830), then the next-player data field NEXT_PLAYER 516 associated with the ball object is cleared (S843), as is any possession time that may have accumulated in the possession-time data field POSSESS_TIME 414 for the player being "held" as next-player, e.g., at a prior iteration of step S834 while the ball was "just passing through" the gaining-possession zone. As addressed more fully below, a player is identified as the putative next player to have possession of the ball by a possession-determining subroutine 842, which operates based on closest proximity to the ball. Therefore, assuming the previously identified player is still closest to the ball on the next iteration of the program, the same player will again be identified as the putative next player to have possession, and this will keep happening until the ball enters the gaining-possession zone around the next player (at which point in time the next player will begin accruing possession time) or until the ball has passed completely out of the gaining-possession zone in the case where the ball was merely moving through the player's gaining-possession zone without the player actually taking possession of the ball.

As further illustrated in the flow diagram 800, if no player is associated with the ball and 1) a next player has not been assigned to the ball (result path 844 from evaluation step S826), i.e., the ball has not come close enough to another player for another player to be identified as the potential next player to possess the ball; or 2) the ball was only briefly near a next player but no longer is (result path 840/841 from evaluation step S830), then the ball will be somewhere in free space. Additionally, even if a player has had possession of the ball right up until the point in time that he or she makes a basket, e.g., in the case of a dunk or a layup, it will also be the case that no player is associated with the ball and a next-player will not have been assigned to the ball in the moments right after the basket has been made. Therefore, in this case (no player is assigned to the ball; next-player is not assigned to the ball; and ball is not near the next-player), the system will need to process the ball to identify the next player who will be, or is, in possession of the ball, or to determine whether the ball has been shot toward or taken to the basket and, if so, whether a basket has been made successfully.

To start this process, the system determines (S846) whether the ball is within the goal zone 304 surrounding any of the hoops on the court. (Even when a player has had possession of the ball right up until the point of making the basket, the system operates fast enough that the ball will still be located within the goal zone 304, in the moments after the basket has been made, for the system to detect the ball's current location and trigger this part of the process.) To do so, the system implements a loop (not specifically illustrated) in which the system retrieves the array 212 for each of the baskets on the court and evaluates whether the horizontal distance between the ball and the center of the goal zone 304 associated with the particular hoop (i.e., $SQRT((X_{ball}-X_{hoop})^2+(Y_{ball}-Y_{hoop})^2))$ is less than the radius R of the goal zone 304 (ZONE_R_GOAL, 224), and whether the vertical position Z of the ball is within the vertical range of the goal zone 304, i.e., between Z=ZONE_GOAL_ZTOP (228) and Z=(ZONE_GOAL_Z-TOP−ZONE_W_GOAL (226)). If the ball is, in fact, located within the goal zone 304 surrounding one of the baskets (result path 848), the HOOP_ID data field 519 is set (S850) to reflect the so-identified hoop whose surrounding goal zone 304 the ball has entered, and the program then invokes a subroutine 852 to evaluate whether a basket has been attempted (and, if so, whether a basket has been made successfully), as addressed more fully farther below. Otherwise, if the ball is not located within the goal zone 304 surrounding one of the hoops (result path 854), the HOOP_ID data field 519 is cleared (S856) of any residual value, and the program invokes the possession-determining subroutine 842 alluded to above, as addressed immediately below.

Figure 10:
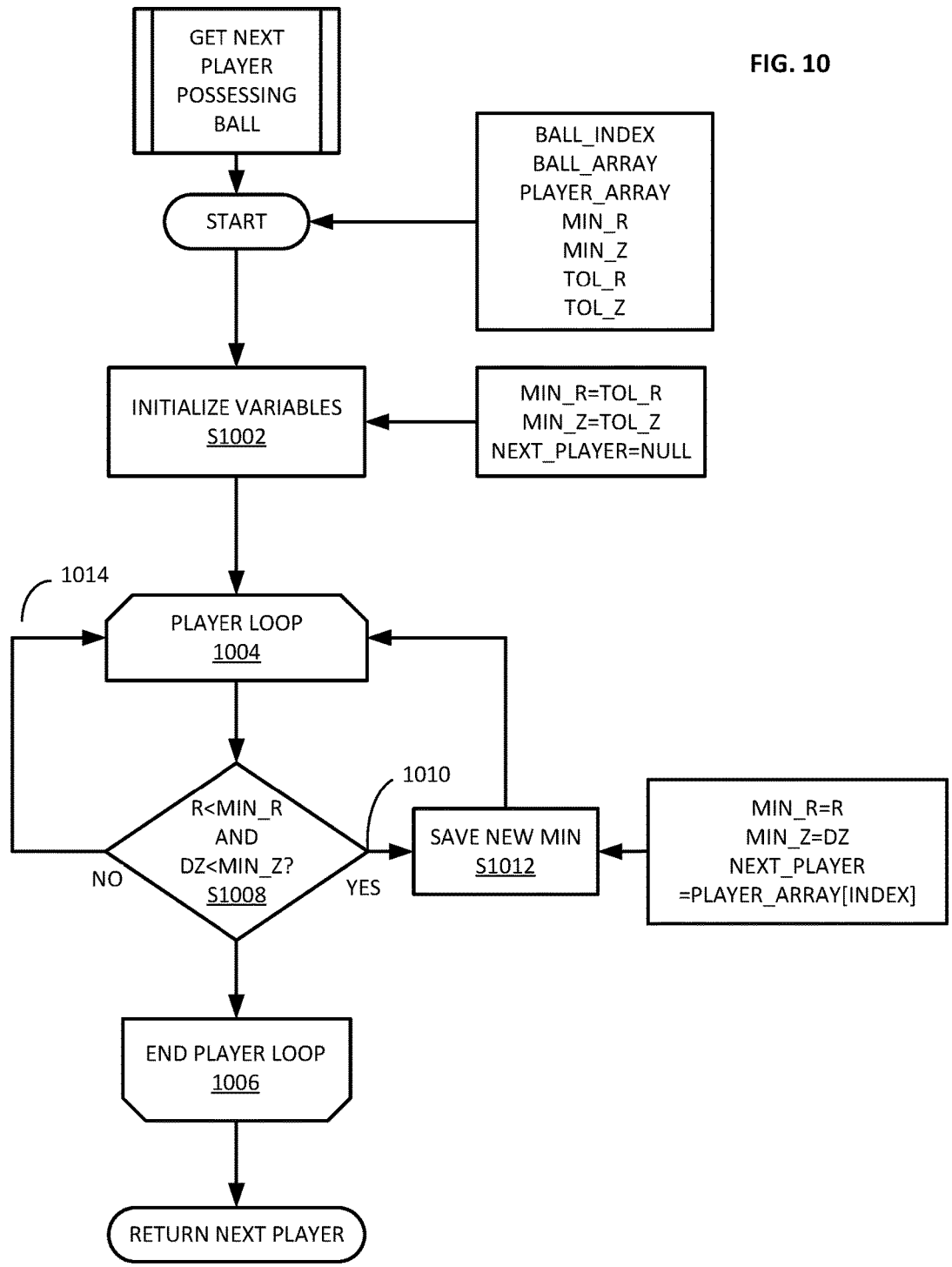
FIG. 10 is a flow diagram illustrating processing of tag-location data that is associated with a ball, to identify a player in possession of the ball, in accordance with the invention.

Operation of the possession-determining subroutine 842 is illustrated by means of the flow diagram 1000 shown in FIG. 10. In general, the subroutine identifies the player who is closest to the ball and, if that player is close enough to the ball to actually have it, assigns the closest player to the ball as presumptively being the next player to be in possession of it. As explained above, actual possession of the ball is not established unless and until the ball is near the putative next-player for a predetermined minimum amount of time (S836). Until that happens, the ball's associated NEXT_PLAYER parameter (516) will be cleared out (S843) before the possession-determining subroutine 842 is invoked. Thus, the subroutine begins by initializing variables (S1002) in order to determine the distance between the ball and the closest player and to be able to keep track of the distance between the ball and all of the various players' tags. In particular, the player who is presumptively the next player to possess the ball is initially set to be unidentified (NEXT_PLAYER (516)=NULL) and is assumed to be at a radial-distance tolerance (MIN_R=TOL_R) and a vertical-distance tolerance (MIN_Z=TOL_Z) away from the ball, which tolerances are maximum values at what a player conceivably could be in possession of the ball. Suitably, the tolerance values may be the same as the horizontal-distance and vertical-distance values that are used to assess proximity of the ball to the players, for determining whether a player has gained possession of the ball or retained possession of the ball as described above.

Next, the system enters a loop with end-points 1004, 1006 that evaluates each player in sequence (S1008) to determine which player, if any, is closest to the ball and within the maximum permitted tolerance. For each iteration of the loop, the system calculates the horizontal distance R between a given player and the ball (R=SQRT(($X_{ball}$–$X_{player}$)^2+($Y_{ball}$–$Y_{player}$)^2) and the vertical distance between the given player and the ball (DZ=$Z_{ball}$–$Z_{player}$). If the values for horizontal distance and vertical distance are both less than the corresponding values for the previously considered player (or the initialized values on the first pass through the loop) (result path 1010), then the player under consideration during the given iteration of the loop is considered to be the player who is closest to, and therefore presumptively next to be in possession of, the ball. In that case, the parameters are updated (S1012) to set the new minimum distances equal to the distances between the ball and the player under consideration (MIN_R=R, MIN_Z=DZ) and to presumptively assign to the ball, as the next player to be in possession of the ball (NEXT_PLAYER (516)=PLAYER_ARRAY[INDEX]), the player under consideration. Otherwise (result path 1014), the process simply circles back to the beginning of the loop (1004) to evaluate the next player in the array of players. Furthermore, if no player is found to be less than the tolerance values of horizontal and vertical distance away from the ball, no next-player value (NEXT_PLAYER (516)) will be assigned to the ball.

As explained above, result path 844 (from evaluation step S826) and result path 840/841 (from evaluation step S830) will be followed when the ball is in free space, e.g., being passed from one player to another or on its way toward a basket. Additionally, as noted above, result path 844 will be followed as soon as a player who has had possession of the ball right up until the point of making a basket no longer has possession. Therefore, whether the ball is in the goal zone 304 surrounding one of the baskets on the court is evaluated at evaluation step S846, as addressed above. If the ball is not within a goal zone, the next player to get possession of the ball is determined via the possession-determining subroutine 842 as addressed above. Otherwise, if the ball is, in fact, within one of the goal zones 304 (result path 848 from evaluation step S846), the program sets the HOOP_ID data field 519 associated with the ball object to identify the hoop in proximity to which the ball is located and then invokes the attempt-identifying subroutine 852, as alluded to above.

Figure 11:
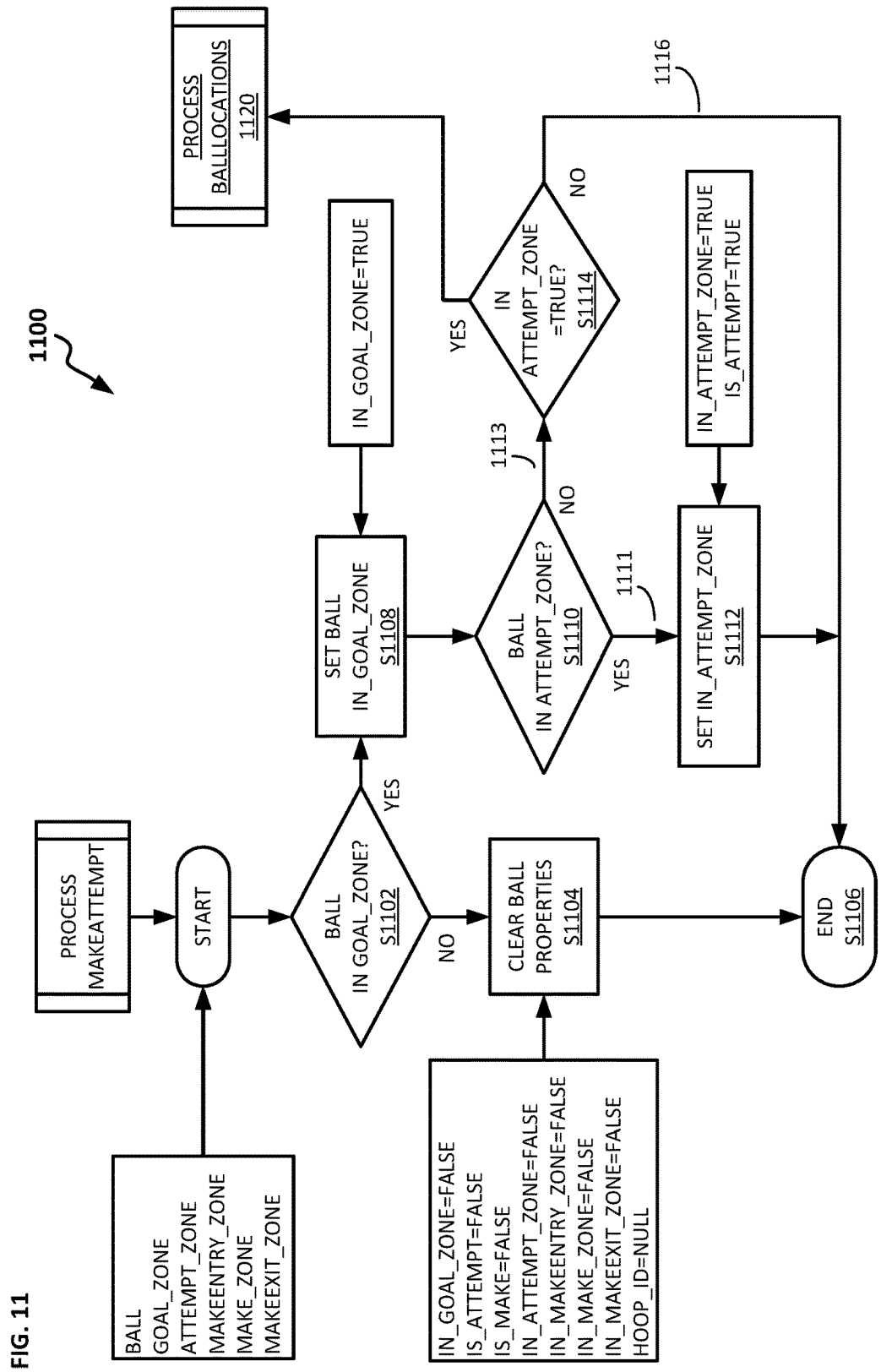
FIGS. 11 and 12 are flow diagrams illustrating processing of tag-location data that is associated with a ball, to identify shot attempts and successful shots, in accordance with the invention.
Figure 12:
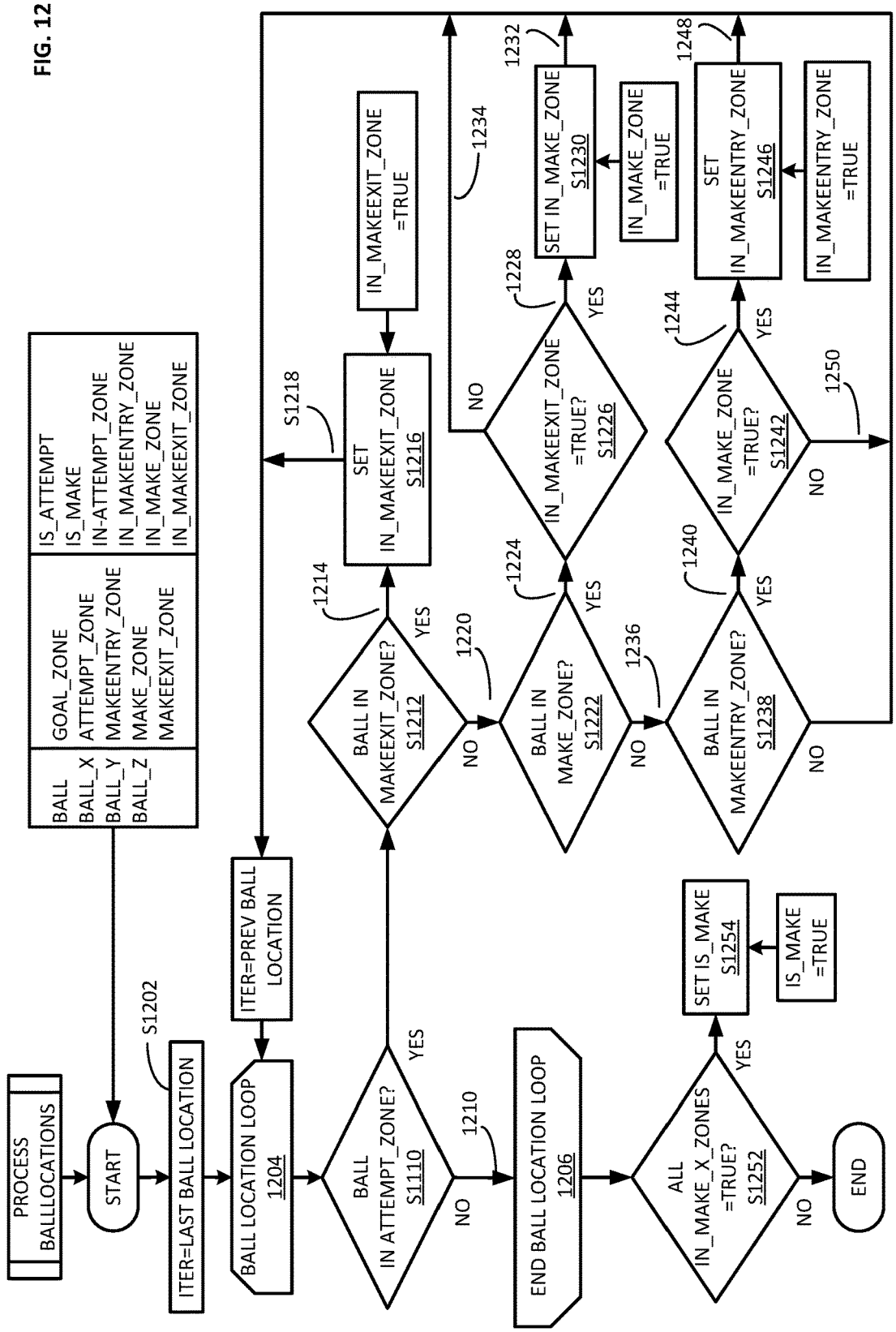

Operation of the attempt-identifying and shot-made subroutine 852 is illustrated in greater detail in the flow diagrams 1100 and 1200 shown in FIGS. 11 and 12, respectively. In particular, the process starts by confirming (S1102) that the ball's X, Y, and Z coordinates place it within the region of the goal zone 304 surrounding the hoop identified in step S846. If the ball is not, in fact, within this zone, then the program clears all ball properties in the ball object pertaining to the position of the ball vis-à-vis the basket (S1104) and returns to the calling process (S1106). Otherwise, if the ball is, in fact, within the goal zone area around the identified basket, then the system sets the ball property IN_GOAL_ZONE 518 to true (S1108).

"Narrowing down" the focus of the analysis, the ball's X, Y, and Z coordinates are next evaluated (S1110) to determine whether the ball is in the attempt zone 308. (As is the case with respect to the goal zone 304, the system operates fast enough that the ball will still be located within the attempt zone 308, in the moments after the basket has been made, for those cases where the player had possession of the ball right up until the point in time the based has been made.) This is done by assessing whether the horizontal distance from the ball's X-Y location to the X-Y center of the hoop (SQRT(($X_{ball}$–$X_{hoop}$)^2+($Y_{ball}$–$Y_{hoop}$)^2)) is less than or equal to the radius of the attempt zone (ZONE_R_ATTEMPT, 230) and whether the Z position of the ball is somewhere in the range descending from the attempt zone top 309 (ZONE_ATTEMPT_ZTOP, 234) downward by an amount equal to the attempt zone height/width (ZONE_W_ATTEMPT, 232). If the ball is, in fact, in the attempt zone 308 (result path 1111), the IN_ATTEMPT_ZONE flag 522 and the IS_ATTEMPT flag 524 are both set to TRUE (S1112) and the process returns (S1106).

If the ball is not in the attempt zone 308 (result path 1113), that could be the result of either 1) the shot having been missed (e.g., bouncing off of the hoop 302 and out of the attempt zone 308 or missing the attempt zone 308 completely) or 2) the shot having been made successfully and passing out of the attempt zone 308 via the three make-related zones (make entry zone 310, make zone 312, and make exit zone 314). Therefore, if the ball is not in the attempt zone 308 when being checked at step S1110, the process checks (S1114) whether the IN_ATTEMPT_ZONE flag 522 has been set (i.e., is true), which would indicate that the ball was in the attempt zone 308 on the previous iteration of the process. If the IN_ATTEMPT_ZONE flag 522 has not been set (result 1116), the process returns (S1106). However, if the IN_ATTEMPT_ZONE flag 522 has, in fact, been set, the PROCESS BALL LOCATIONS subroutine 1120 is invoked. This subroutine cycles through the ball's preceding locations, in reverse chronological order over the last few second (e.g. four seconds), to determine whether the ball has travelled a path through space that took it through the hoop—in effect, whether a basket has been made successfully.

As illustrated by the flow diagram 1200 shown in FIG. 12, the PROCESS BALL LOCATIONS subroutine begins (S1202) by setting a loop iterator to the index of the previous location of the ball, i.e., the location just prior to the ball no longer being in the attempt zone 308. Next, a ball-locating loop with endpoints 1204, 1206 begins evaluating each preceding ball location in reverse order, essentially following the path of the ball backwards as it (potentially) passes through the various zones around and adjacent to the hoop 303.

The first evaluation (S1208) in the loop tests whether the ball's location—starting with the location just prior to the location-tracking subroutine 1120 being invoked—is within the attempt zone 308 using the same calculations as for step S1110. (For the first pass through the subroutine 1120, this will be true.) If the ball's location for a given preceding point in time is not in the attempt zone 308 (result path 1210)—i.e., the given preceding point in time is the point in time just prior to the ball entering the attempt zone 308—then the loop 1204/1206 terminates.

Otherwise, if the ball's location for the given preceding point in time is (still) in the attempt zone 308, the process checks (S1212) whether the ball's location is in the make exit zone 314. More particularly, the system checks whether the horizontal distance between the ball and the center of the make exit zone 314 (SQRT(($X_{ball}$–$X_{hoop}$)^2+($Y_{ball}$–$Y_{hoop}$)^2)) was less than the radius R of the make exit zone 314 (ZONE_R_MAKEEXIT, 244), and whether the ball was within the vertical range between the top of the make exit zone 314/bottom of the make zone 312 ($Z=Z_{hoop}$ (220)–ZONE_W_MAKE (242)) and the bottom of the make exit zone 314 ($Z=Z_{hoop}$ (220)–(ZONE_W_MAKE (242)+ZONE_W_MAKEEXIT (246)). If the ball's location for the given preceding point in time was in the make exit zone 314 (result path 1214), the IN_MAKEEXIT_ZONE flag 532 is set to true (S1216) and the loop continues (path 1218) to consider the next-preceding ball location.

On the other hand, if it is determined at step S1212 that the ball's location at the given preceding point in time was not in the make exit zone 314 (result path 1220), the same location is tested (S1222) to determine whether it was within the make zone 312. In particular, the system checks whether the horizontal distance between the ball and the center of the make zone 312 (SQRT($(X_{ball}-X_{hoop})^2+(Y_{ball}-Y_{hoop})^2$)) was less than the radius R of the make zone 312 (ZONE_R_MAKE, 240), and whether the ball was within the vertical range between the top of the make zone 312 ($Z=Z_{hoop}$ (220)) and the bottom of the make zone 312 ($Z=Z_{hoop}$ (220)- ZONE_W_MAKE (242)). If the location was in the make zone 312 (result path 1224), then the processes further checks (S1226) whether the IN_MAKEEXIT_ZONE flag 532 has been set to TRUE (on a previous iteration of the loop). If the IN_MAKEEXIT_ZONE flag 532 has been set to TRUE (result path 1228), then this indicates that the path of the ball has carried it from the make zone 312 directly into the make exit zone 314, in which case the IN_MAKE_ZONE flag (530) is set to TRUE (S1230) and the loop continues (path 1232) to consider the next-preceding ball location. Otherwise, if the IN_MAKEEXIT_ZONE flag 532 has not been set to TRUE (result path 1234), the loop continues to consider the next-preceding ball location without the IN_MAKE_ZONE flag (530) having been set to TRUE.

Further still, if it is determined at step S1212 that the ball's location at the given preceding point in time was not in the make exit zone 314 (result path 1220), and it is also determined at step S1222 that the ball's location at the given preceding point in time was not in the make zone 312 (result path 1236), then the process proceeds to determine (S1238) whether the ball's location at the given preceding point in time was within the make entry zone 310. In particular, the system checks whether the horizontal distance between the ball and the center of the make entry zone 310 (SQRT $((X_{ball}-X_{hoop})^2+(Y_{ball}-Y_{hoop})^2)$) was less than the radius R of the make zone entry 310 (ZONE_R_MAKEENTRY, 236), and whether the ball was within the vertical range between the top of the make entry zone 310 ($Z=Z_{hoop}$ (220)+ZONE_W_MAKEENTRY (238)) and the bottom of the make entry zone 310, i.e., the hoop location ($Z=Z_{hoop}$ (220)). If the given preceding location was in the make entry zone 310 (result path 1240), then the processes further checks (S1242) whether the IN_MAKE_ZONE flag 530 has been set to TRUE (on a previous iteration of the loop). If the IN_MAKE_ZONE flag 530 has been set to TRUE (result path 1244), then this indicates that the path of the ball has carried it from the make entry zone 310 directly into the make zone 312, in which case the IN_MAKEENTRY_ZONE flag (528) is set to TRUE (S1246) and the loop continues (path 1248) to consider the next-preceding ball location. Otherwise, if the IN_MAKE_ZONE flag 530 has not been set to TRUE (result path 1250), the loop continues to consider the next-preceding ball location without the IN_MAKEENTRY_ZONE flag (528) having been set to TRUE.

This process of setting the iterator ITER to the next previous ball location and testing the location against the various make zones in reverse chronological order continues until the preceding ball location was no longer in the overarching attempt zone 308 at all, thereby effectively testing whether the trajectory of the ball passes through all three of the hoop "make" zones in sequential order. In other words, the process determines whether a shot has been made successfully, and it is robust enough to identify those situations in which a player has taken the ball to the basket (dunk or layup) to make the basket. Thus, after the loop is completed, the process checks (S1252) whether all three "make" flags (IN_MAKEENTRY_ZONE (528), IN_MAKE_ZONE (530), and IN_MAKEEXIT_ZONE (532)) have been set. If all three flags have been set to TRUE, then the path of the ball was through the hoop—i.e., the shot was successful—and the IS_MAKE flag (534) is set to TRUE. The ball-processing subroutine 614 (flow diagram 800) then returns the IS_ATTEMP flag (524) and the IS_MAKE flag (524) to the overall program, and the statistics for the last player to have been in possession of the ball prior to the shot being taken can be updated accordingly (not illustrated).

Coordination of Data Communications Between Tags and Anchors

As noted at the outset of this description, we have improved upon the data transmission timing protocols typically found in an anchor/tag-based location-tracking system, in order to avoid "collisions" between simultaneously broadcast signals within a given channel. Toward that end, the improved date transmission methodology provides devices and methods for coordinating data transmissions among the anchors and tags (generically referred to as nodes) in the data communications network by precise scheduling and continual management of transmission time intervals for each anchor or tag. The master anchor specifies discreet transmission time intervals, termed reserved time slots, for each node. The reserved time slots are subdivisions of larger time intervals, termed windows, which are themselves subdivisions of larger blocks of time, called time division blocks. As tags are added to the network, each tag is assigned a reserved time slot in which to exchange transaction packets with the master anchor. The master anchor is configured to detect and process transaction packets broadcast by the tags during their reserved slots of time, and in turn transmit additional timing instructions back to each tag, if necessary, to ensure that each tag's data transmission activity continues to occur within its reserved time slot.

The time division blocks, which are defined by the master anchor, include a configuration window and at least one transaction window. During the configuration window of the time division block, the master anchor detects and processes configuration request packets broadcast by new tags wishing to join the network and start exchanging data with the master anchor. In response to receiving a configuration request from a new tag during the configuration window, the master anchor establishes a reserved time slot within the transaction window for the new tag, and then broadcasts a configuration response packet to the tag, which provides the reserved time slot to the tag, along with specific operating parameters for the tag to follow, including an initial time delay for the tag to wait before making its first attempt to broadcast a set of transaction packets. The master anchor may detect and admit multiple tags to the network during the configuration window, thereby establishing reserved time slots and initial time delays for all of the admitted tags. During the transaction window, when the reserved time slot for a particular tag arrives, the master anchor detects and processes the set of transaction packets broadcast by that particular tag.

This approach to coordinating the various data transmission is illustrated in FIGS. 13-17B.

Figure 13:
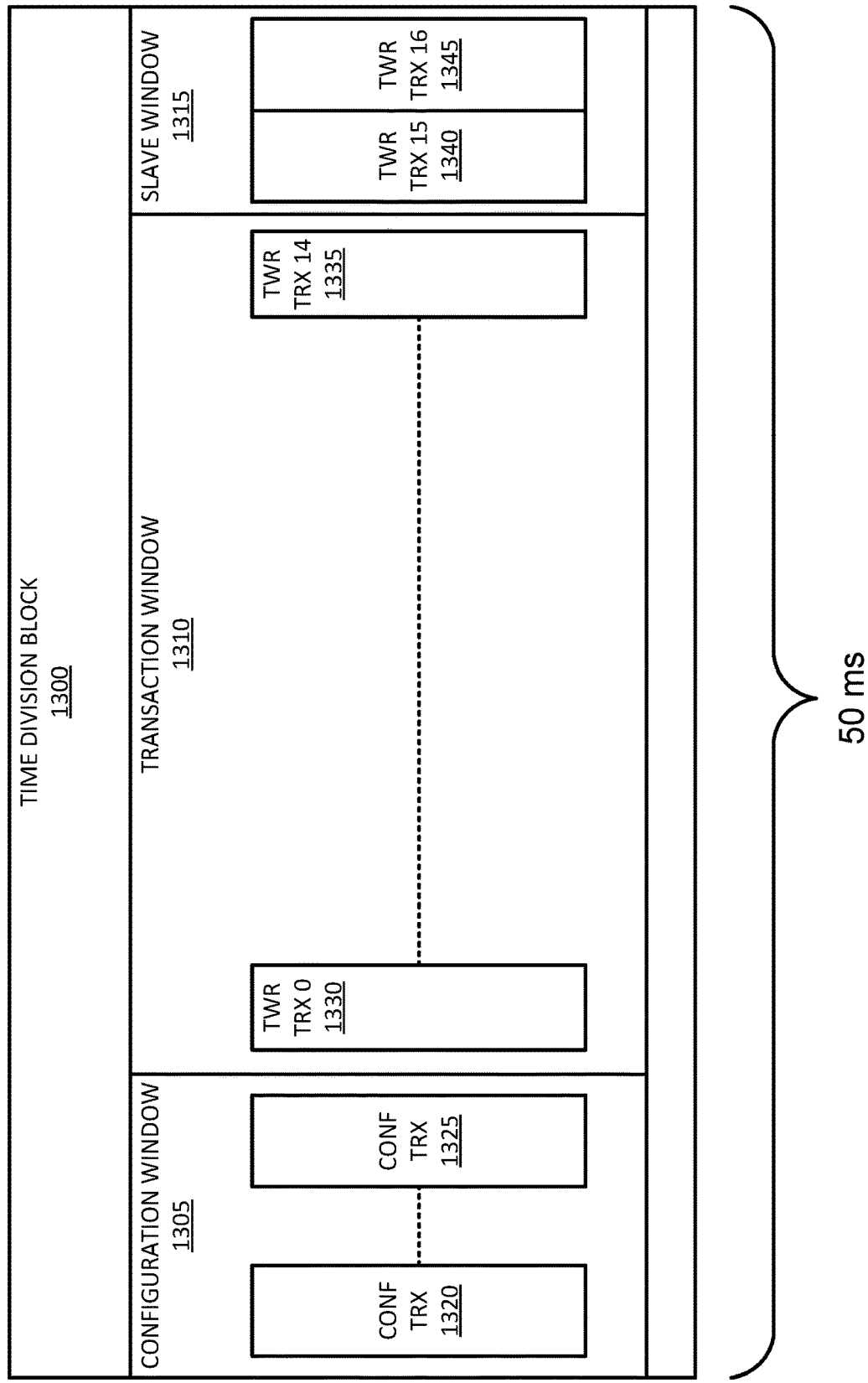
FIG. 13 is a diagram representing the structure of a time division block for radio communications that may be used in one implementation of the present invention.

In implementations of the system as illustrated above, the master anchor $A_M$ measures and divides the passage of time into a continuous stream of adjacent time division blocks. FIG. 13 shows an example of a time division block 1300 as may be defined by the master anchor $A_M$ in implementations of the system. Each time division block 1300 spans a fixed length of time, such as 50 milliseconds long. It is understood by those in the art, however, that time division blocks of shorter or longer intervals may be used, depending on the number, type and transmission speeds of the tags used in the wireless data communications network. When the length of the time division block is defined to be 50 milliseconds long, then the network repetition cycle is 20 Hz (i.e., each second comprises 20 consecutive time division blocks). If the time division block 1300 is too large, then the master anchor $A_M$ will not be able to receive and process consecutive signals from rapidly-moving tags fast enough to track their current locations in real time. If the time division block 1300 is too small, then it will not have sufficient room to reserve time slots for a large number of tags.

As shown in FIG. 13, the time division block 1300 comprises three separate subdivisions of time, including a configuration window 1305, a transaction window 1310, and a slave window 1315. The configuration window 1305, which is reserved for configuration functions, such as detecting and admitting new tags, lasts 20 ms, and is further divided into discrete time slots 1320 to 1325, during which configuration data packets are exchanged.

The transaction window 1310 lasts 20 ms, and is further subdivided into fifteen reserved time slots 1330 to 1335, during which the master anchor $A_M$ receives and processes transaction packets broadcasted by tags operating in the wireless data communications network. All of the transactions between the master anchor $A_M$ and tags occur within these reserved slots 1330 to 1335. This partition of the transaction window 1310 can accommodate data packet exchanges with up to 15 tags. Optionally, the system can also allocate a third segment of time called the slave window 1315, which lasts 10 ms. Within slave window 1315, signals from up to 2 slave anchors $A_{S(n)}$ can be exchanged during reserved time slots 1340 and 1345.

As noted above, the wireless sensor installation 100 that can be employed with the invention utilizes two-way communication and ranging and is illustrated in FIGS. 1A and 1B. More particularly, the system employs a particular two-way ranging method called "snooping," in which the player tags $P_{(n)}$ and the basketball tags $B_{(n)}$ exchange data packets directly with the master anchor $A_M$, and the slave anchors $A_{S(n)}$ simultaneously listen for the data transmissions emanating from the player tags $P_{(n)}$ and the ball tags $B_{(n)}$. The slave anchors $A_{S(n)}$ transmit their own data packets to the master anchor $A_M$ during the slave window 1315 of time division block 1300 shown in FIG. 13. This additional snooping data from the slave anchors $A_{S(n)}$ is then used by the computer 106 connected to the master anchor $A_M$ in the wireless sensor installation 100 to calculate the locations of the players and the balls as described above.

The master anchor $A_M$ can be its own transponder, acting as a gateway node through which the computer 106 can access the wireless sensor installation 100, or it could be incorporated directly into the computer 106. In one implementation, the computer 106 connected to master anchor $A_M$ may be configured to apply well understood ranging techniques, such as two-way ranging, to determine the locations of the various player tags and ball tags in real-time. This is achieved by the computer 106 continuously processing information conveyed in the exchange of data packets between each active node joined to the wireless sensor installation 100 during each time segment of the time division block 1300 shown previously in FIG. 13. The tags will perform their ranging functions during their reserved time slots within reserved time slots 1330 to 1335 of the transaction window 1310, and the slave anchors $A_{S(n)}$ will transmit their data during their reserved time slots within the reserved time slots 1340 and 1345 of slave window 1315, as depicted previously in FIG. 13.

Figure 14:
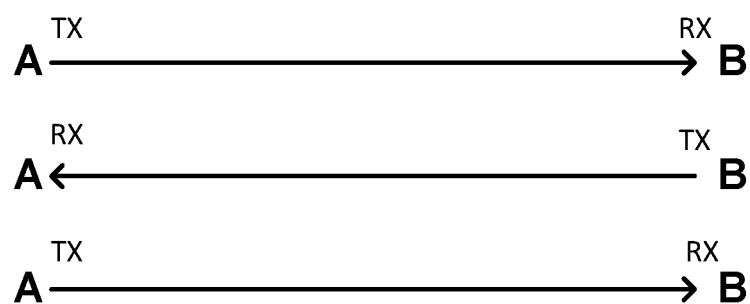
FIG. 14 is a high-level diagram showing the order and direction of travel for packet transmission in a two-way ranging transaction between nodes within the network depicted in FIGS. 1A and 1B.

FIG. 14 shows a typical ranging transaction between two nodes at point A and point B. If the clocks in the nodes at points A and B were perfectly in sync with each other, then a single packet would suffice for the localization calculations. However, even though modern electronics are very close in terms of clock rates (to within millionths of a second), they can never achieve absolutely perfect synchronization, and initially slight discrepancies between the clocks multiply over time, causing the clocks in the separate nodes to drift farther and farther apart from each other. Due to this fact, each node in the installation 100 is assumed to have its own time domain. Three packets are exchanged between the nodes at points A and B, with a timestamp relative to each node's time domain generated by each unique transmission event and reception event (i.e., six timestamps). The node at point A initiates, and the node at point B calculates. In the implementation of the two-way ranging system shown in FIGS. 1A and 1B, the data rides as a data payload on the last packet sent. This ranging data piggybacks on packets without compromising arrival times of the signals.

While the wireless sensor installation 100 will function adequately with only two anchors, namely, a master anchor $A_M$ and a single slave anchor $A_S$, additional slave anchors $A_{S(n)}$ may be added to the network to increase the precision and fidelity of the location data and to avoid problems that might arise, for example, when a direct line of sight between a tag and one anchor is obstructed by a person or object on the court.

Figure 15A:
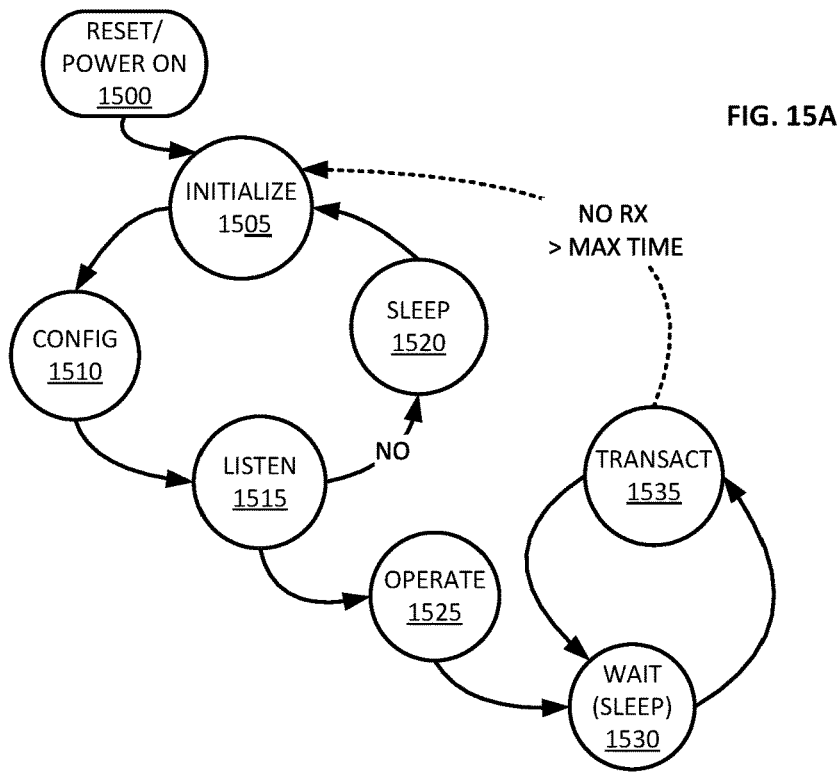
FIGS. 15A and 15B are high-level state diagrams illustrating the various states and functions for a tag node and a master anchor node as executed by one implementation of the present invention.

FIG. 15A shows a state diagram for an active tag—e.g., a ball tag $B_{(n)}$ or a player tag $P_{(n)}$—as used with the invention. Following a power-on or reset state 1500, the tag first enters an initialization state 1505, in which the parameters defined by the firmware within the tag's electronic chip are initialized. The tag next enters a configuration request state 1510, in which the tag broadcasts a configuration request to announce its presence to the network and to request operating instructions from the master anchor $A_M$. Next, the tag will enter a listening state 1515, in which the tag listens for a response from the master anchor $A_M$ to its configuration request. If no response is received while the tag is in the listening state 1515, then the tag will reduce its power consumption and enter a sleeping state 1520 for a randomly assigned time period of between one and three seconds before reawakening and returning to the initialization state 1505. Although the tags can be potentially disruptive in the event of signal collisions within a channel until the tag's beacon falls within the configuration window, the configuration request signal is extremely short, thereby minimizing any potential for signal jamming or data loss.

If the tag receives a configuration response containing operating instructions from the master anchor $A_M$ while it is in the listening state 1515, then the tag next enters an operational state 1525, in which the tag processes configuration parameters provided by the master anchor $A_M$. One such configuration parameter comprises an initial delay period that the tag should wait before beginning to broadcast transaction packets to the master anchor $A_M$. The tag next enters a waiting state 1530 for a period of time equal to the initial delay period, during which the tag reduces its power consumption and sleeps. When the initial delay period has expired, the tag enters a transaction state 1535. In one implementation, the tag exchanges transaction packets, such as ranging packets, with the master anchor $A_M$ during the transaction state 1535. However, the installation 100 may be configured to exchange any other types of data during the transaction window, and not just ranging data. Following the first exchange of transaction packets, the tag moves back into the waiting state 1530, and waits for the next reserved time slot in the next transaction window of the next time division block before returning again to the transaction state 1535.

As the tag moves through states 1505, 1510, 1515, and 1520, the packets exchanged with the master anchor $A_M$ include a configuration request, a configuration response, and a configuration acknowledgment. In one implementation, the configuration window is approximately 500 microseconds long. Configuration packet exchanges are only initiated by tags that have not yet been configured, and the master anchor $A_M$ will only respond to a configuration request if it hears the configuration request within 600 microseconds of the end of the configuration window, thus preventing configuration packet exchanges from interrupting or delaying tag or slave anchor $A_{S(n)}$ packet exchanges. If the configuration-initiating tag hears the configuration response within 1.5 ms of sending a configuration request, it will respond with a configuration acknowledgment packet, and then schedule a ranging transaction so that it occurs during the reserved time slot of the transaction window. If the initiating tag does not hear a response within 1.5 ms, then it will enter the sleep state 1520 for a random amount of time (typically between one and three seconds) before attempting to send another configuration request.

The configuration response transmitted by the master anchor $A_M$ contains the initial delay period that the tag should wait before attempting to broadcast a two-way ranging transaction to the master anchor $A_M$. The configuration response also contains the tag's transmission period, the network ID (used when multiple networks are available) and the network timeout. The network timeout tells the tag how many consecutive times the device should attempt to communicate with the master anchor $A_M$ without receiving a response from the master anchor $A_M$. The data contained in each configuration packet in one implementation of the system is discussed in greater detail below with reference to FIG. 16.

In exemplary implementations of the network that use two-way ranging to determine tag location, the data packets exchanged with the master anchor $A_M$ while a given tag is in transaction state 1535 may include a two-way ranging request, a two-way ranging response, and a two-way ranging acknowledgment. It takes approximately 5 ms for a tag to wake up from a sleeping state. In the exemplary implementation, a tag transaction is approximately 1 millisecond in length. If a tag has more than 10 ms before its next scheduled transaction (twice the amount of time it takes for the tag to wake up), then it will sleep until approximately 5 ms before its next transmission, and then wake up in time to be ready to transmit during its reserved time slot 1330 to 1335 shown previously in FIG. 13. Therefore, if the time division block is 50 ms, and the transaction packet exchange lasts for 1 ms, then the tag will sleep for approximately 44 ms of each time division block. At the scheduled transaction time, the tag sends a transaction packet, such as a two-way ranging request, to the master anchor $A_M$. In preferred embodiments, the tag uses the period it received from the master anchor $A_M$ in its last communication with the master anchor $A_M$ in order to schedule the next tag transaction, which reduces the drift that might otherwise occur if the tag's clock moves at a rate that is slightly different from the rate of the master anchor's clock.

When the master anchor $A_M$ receives a two-way ranging request, it generates a two-way ranging response. This response contains the delay that the tag should wait before sending the next two-way ranging request, the period value, and other network data. If the tag receives a two-way ranging response from the master anchor $A_M$, then it will respond with a two-way ranging acknowledgment packet and update its scheduled tag transaction time with the adjusted delay received in the two-way ranging response. If the tag does not receive a two-way ranging response within 1.5 ms, then it will use the period last assigned by the master anchor $A_M$ to determine the next transaction time. At the end of the two-way ranging transaction, or after the reception timeout expires, the tag returns to a low power sleep state. The data contained within each type of transaction packet used by one implementation of the network is discussed in greater detail below with reference to FIG. 16.

Figure 15B:
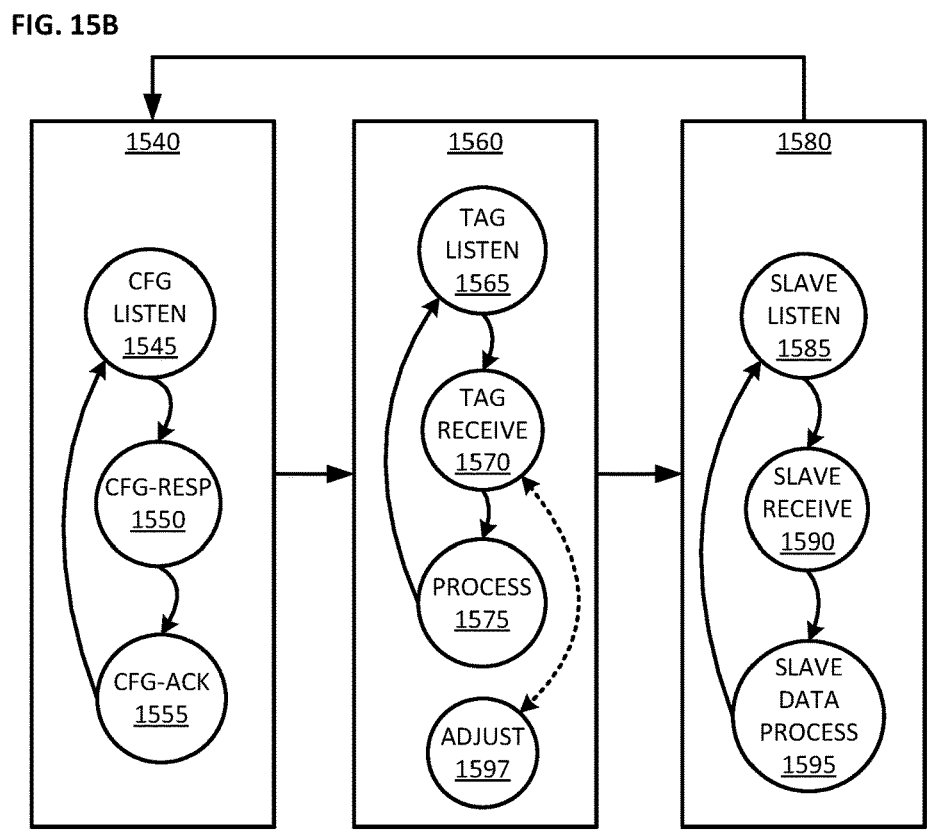

FIG. 15B shows a state diagram for the master anchor $A_M$ as used by an exemplary implementation of the installation 100. As shown in FIG. 15B, the master anchor $A_M$ cycles through three separate phases of operation, corresponding to the three windows in the time division block, beginning with a configuration phase 1540, in which the master anchor $A_M$ detects configuration request packets broadcast by any new tags that are not already member of the master anchor's data communications network and wish to be added to the network. This is followed by a transaction phase 1560, during which the master anchor $A_M$ and tags exchange transaction packets. Finally, the master anchor $A_M$ enters the slave phase 1580, during which the master anchor $A_M$ exchanges two-way ranging data packets with the slave anchors $A_{S(n)}$.

In the configuration phase 1540, which corresponds to the configuration window 1305 of FIG. 13, the master anchor $A_M$ moves through several distinct states. The master anchor $A_M$ first listens for any configuration requests broadcasted by new tags attempting to join the network (configuration listening state 1545). Upon detection of a configuration request from a new tag not yet joined to the network, the master anchor $A_M$ will move to a configuration response state 1550, in which the configuration parameters specific to the new tag are assembled and transmitted back to the tag. This is followed by a final configuration acknowledgment state 1555, where the master anchor $A_M$ attempts to receive and process a confirmation message from the new tag confirming that the new tag has successfully received and processed the configuration parameters transmitted by the master anchor $A_M$. The master anchor $A_M$ then returns to the listen state 1545.

In this manner, the master anchor $A_M$ receives and processes configuration requests and sends configuration parameters back to the tags, relaying to the tags crucial operating parameters such as their repeat rate, when the tags will begin transmitting relative to when each tag entered network, where in the transaction window the tag's reserved time slot falls, and when to transmit transaction packets relative to each tag's time domain. The master anchor $A_M$ may also be configured to tell the tag how long it should wait to receive responses from the master anchor $A_M$ before timing out (network timeout parameter), as well as how many times to repeat a configuration request before the tag assumes that no network is available and shuts down.

Within the transaction phase 1560, which corresponds to the transaction window 1310 shown previously in FIG. 13, the master anchor $A_M$ exchanges transaction packets in a sequential manner with each of the tags currently joined to the network, first listening for transmissions from the tags in tag listening state 1565, then receiving and analyzing transaction packets from the tag in receiving state 1570, and finally processing transaction packets in the transaction processing state 1575. The master anchor $A_M$ has the ability to determine how accurately each tag transmits within its reserved time slot by analyzing transmission time stamps upon receipt and comparing this information to the list of reserved time slots, entering an adjustment state 1597, as necessary, to account for any drifting toward the boundaries of the reserved time slot. Details of the operation of the master anchor $A_M$ during the adjustment state 1597 are discussed in greater detail below with reference to FIG. 17B.

Within the slave transaction phase 1580, which corresponds to the slave window 1315 shown previously in FIG. 13, the master anchor $A_M$ exchanges data packets with the slave anchors $A_{S(n)}$. First the master anchor $A_M$ listens for transmissions from slave anchors $A_{S(n)}$ in slave listening state 1585. Then the master anchor $A_M$ receives transmitted signals from the slave anchors $A_{S(n)}$ during receiving state 1590. Finally, the master anchor $A_M$ processes the snooping data discussed above during the slave data processing 1590. In one exemplary implementation, the slave data packet exchange includes a two-way ranging request, a two-way ranging response, and a two-way ranging acknowledgment between a slave anchor $A_{S(n)}$ and a master anchor $A_M$. A slave transaction may be approximately 3 milliseconds in length. Slave transactions are similar to tag transactions, except that slave anchors $A_{S(n)}$ do not sleep, and the final packet of a slave transaction is a two-way ranging acknowledgment packet, on which the snoop data piggybacks as additional payload.

For the purpose of scheduling, the master anchor $A_M$ may be configured, in some implementations, to first sort the list of tags and anchors $A_{S(n)}$ in the network by device type and repeat rate. The tags are placed in the list first, and are then sorted by their repeat rates such that lower repeat rates are scheduled first in the transaction window. All devices are then assigned transaction numbers and phases. Time slots in the transaction window are reserved and assigned to tags based upon their repeat rate settings. In one implementation of the network, if a tag's repeat rate setting is such that it does not perform two-way ranging during every time division block 1300 (shown in FIG. 13), then that tag may be instructed by the master anchor $A_M$ to share a reserved time slot with one or more other tags that do not require exchanging two-way ranging packets during every time division block 1300. For example, if two tags are sharing a reserved time slot, then each tag will transmit transaction packets in alternating fashion, every other time the reserved time slot occurs. If the repeat rate setting corresponds to a repeat rate of 20 Hz, which is equal to 50 milliseconds per each cycle (the magnitude of the time division block 1300), then that tag is expected to transmit transaction packets every single time that the reserved time slot occurs and does not share that time slot with any other device. In this manner, the 15 tag transaction slots are filled. Slave anchors $A_{S(n)}$ are assigned time slots in the order they are received from the master anchor $A_M$. The slave anchors $A_{S(n)}$ are always configured so that their repeat rate is equivalent to the length of the time division block (50 milliseconds).

FIG. 16 shows the order of fields in each packet for each type of data transmission packet exchanged between the nodes of on exemplary implementation of the installation 100. As shown in FIG. 16, there are six types of data transmission packets used in the configuration and transaction events during operation of the system.

The configuration request packet 1601 contains data in binary form, beginning with an identification of the packet type 1600, information about the packet version 1602, and the network ID 1604, which would be needed if multiple wireless data communications networks are operating in close proximity to each other. The configuration request packet 1601 also carries the broadcast address 1606, and the specific serial number 1608 for the tag sending the configuration request packet 1601. This serial number is unique to each tag manufactured of a particular model, and is included so that the system can recognize what data protocols will be needed for the successful exchange of data. A final element of configuration request packet 1601 is a sequence number 1610, which is an arbitrary number that increments for each transmission, providing a particular number for every event during the operation of the system.

The configuration response packet 1603 also contains a field 1612 that identifies the type of packet, followed by the packet version field 1614, and the network ID field 1616. The serial number field 1618 will be the same serial number used in field 1608 of the configuration request packet 1601 and serves to confirm that the master is transmitting a configuration response packet 1603 meant for the specific tag that transmitted the configuration request packet 1601. Also contained in the configuration response packet 1603 is the master address field 1620, a sequence number field 1622, and a destination address field 1624. Field 1624 contains the device configuration data for that particular tag or slave anchor $A_{S(n)}$. Field 1628 contains the delay time in milliseconds, which tells the tag how long it should wait until beginning its first data transaction, and field 1630 contains the period in milliseconds, which tells the tag how long to wait to repeat its transmission relative to its own time domain. The last field 1632 in the configuration response packet 1603 contains the time out parameter, which tells the tag how long it should wait if no response is received from the master anchor $A_M$ during the transaction window. Fields 1612-1622 are considered to be the "header" data for configuration packet 1603, while fields 1624-1632 are considered to carry the "payload."

The configuration acknowledge packet 1605 contains the packet type field 1634, the packet version field 1636, the network ID field 1638, the master address field 1640, which will be the same data used in the master address field 1620 of the configuration response packet 1603. The tag address field 1642 will have the same data as the destination address field 1624 from the configuration response packet 1603, which ensures that the tag and master anchor $A_M$ transmit to one another during each packet transaction. A sequence number field 1644 completes the configuration acknowledge packet 1605.

The two-way ranging request packet 1607, two-way ranging response packet 1609, and the two-way ranging acknowledgment packet 1611 are exchanged by the master anchor $A_M$ and tags during the transaction windows. The two-way ranging request packet 1607 contains the packet type field 1646, the packet version field 1648, the network ID field 1650, and the master address field 1652, followed by the tag address field 1654. Next is the two-way ranging ID field 1656, which is an identifier unique to that particular two-way ranging transaction. The sequence number field 1658 follows, and the transmission time field 1660 completes the two-way ranging request packet 1607.

The two-way ranging response packet 1609 contains the packet type field 1662, the packet version field 1664, the network ID field 1666, and the tag address field 1668, which carries the same information as the tag address field 1654 of the two-way ranging request packet 1607. The master address field 1670 contains the same information as the master address field 1652 of the two-way ranging request packet 1607. Next is the two-way ranging ID field 1672, which contains the same identifier as the two-way ranging ID field 1656 of the two-way ranging request packet 1607. The sequence number is contained in field 1674, the delay parameter field 1676, and the transmission period is provided in field 1678. In the two-way ranging response packet 1609, the delay field 1676 and period field 1678 are the payload and serve as a means of adjusting the start of the tag transmissions during each two-way ranging transaction to ensure that each tag continues to transmit during its reserved slot.

The two-way ranging acknowledgment packet 1611 contains the packet type field 1680, the packet version field 1682, the network ID field 1684, and the master address field 1686, which carries the same information as the master address field 1670 of the two-way ranging response packet 1609. The data contained in the tag address field 1688 is the same information as the data in tag address field 1668 of the two-way ranging response packet 1609. The two-way ranging ID field 1690 follows, and it contains the same identifier as the two-way ranging ID field 1672 of the two-way ranging response packet 1609. The sequence number is contained in field 1692. The final two fields of the two-way ranging acknowledgment packet 1611 are the receive time field 1694 and the transmit time field 1696, which are used to calculate the tag's position.

Other data can be piggybacked to the transaction packets as additional payload, such as biometric information, tag status information, tag battery health, and any other information useful to the system to maintain optimal network performance or to populate an array or database for use as supplementary event analysis.

Figure 17A:
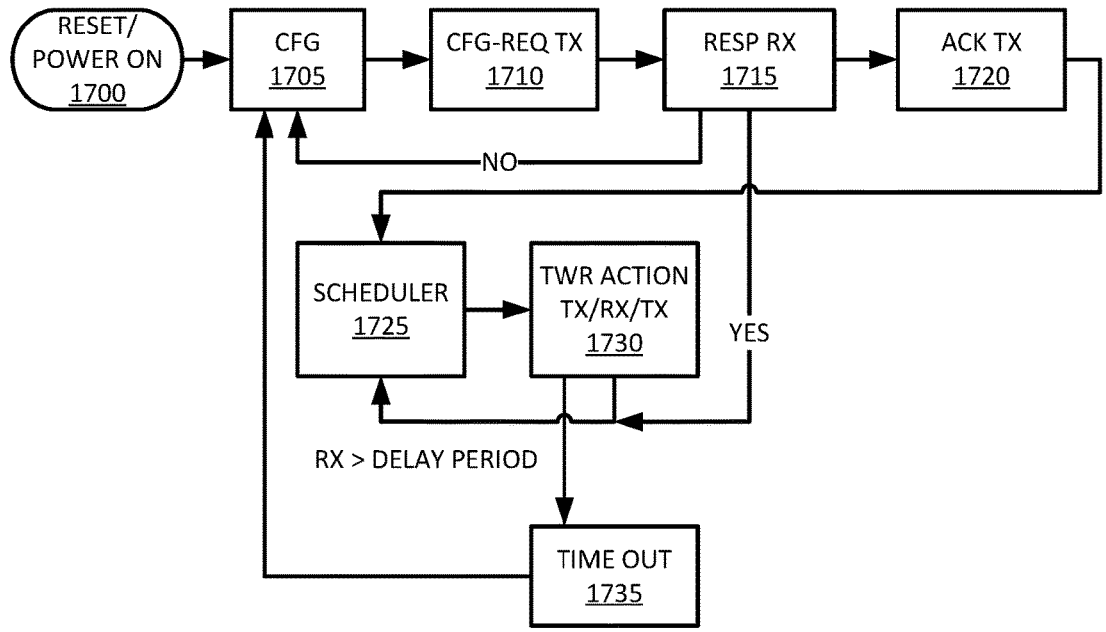
FIGS. 17A and 17B are high-level flow diagrams illustrating exemplary algorithms for data transmission control processes carried out by a tag node and a master anchor node in one exemplary implementation of the present invention.

FIG. 17A shows a flow diagram detailing the actions performed by a tag in one exemplary implementation of the installation 100. The tag first becomes active at the power on or reset step 1700. The tag enters the configuration state at step 1705 in which it announces its presence to the network. Upon detection by the network, the tag transmits a configuration request 1710, receives a configuration response 1715, and transmits a configuration acknowledgment 1720. If, after transmitting the configuration request in step 1710, no configuration response is detected at step 1715, the tag returns to the configuration step 1705 and again attempts to announce itself to the network. If the tag does receive a configuration response in step 1715, information from the configuration response and acknowledge packets are used by the scheduler 1725 to direct the two-way ranging actions 1730 of transmit, receive, and transmit. If, during the two-way ranging actions of step 1730, the tag comes to a point where it does not receive a signal from the master anchor $A_M$, the tag will enter the time out step 1735, which causes the tag to go back to the configuration step 1705.

In one implementation of the network, the configuration response data packet provides a network timeout parameter to the tag (see field 1632 in FIG. 16). This timeout tells the tag how long it should wait for a response from the master anchor $A_M$ before timing out. Alternately, each time a tag sends a transaction request, a variable denoting the number of times the tag attempted the request timeouts is incremented. Upon the reception of a transaction response, the device resets the attempt counter to zero. Should the attempt counter exceed the predefined threshold, then the tag will drop off the network and begin requesting a new configuration.

Figure 17B:
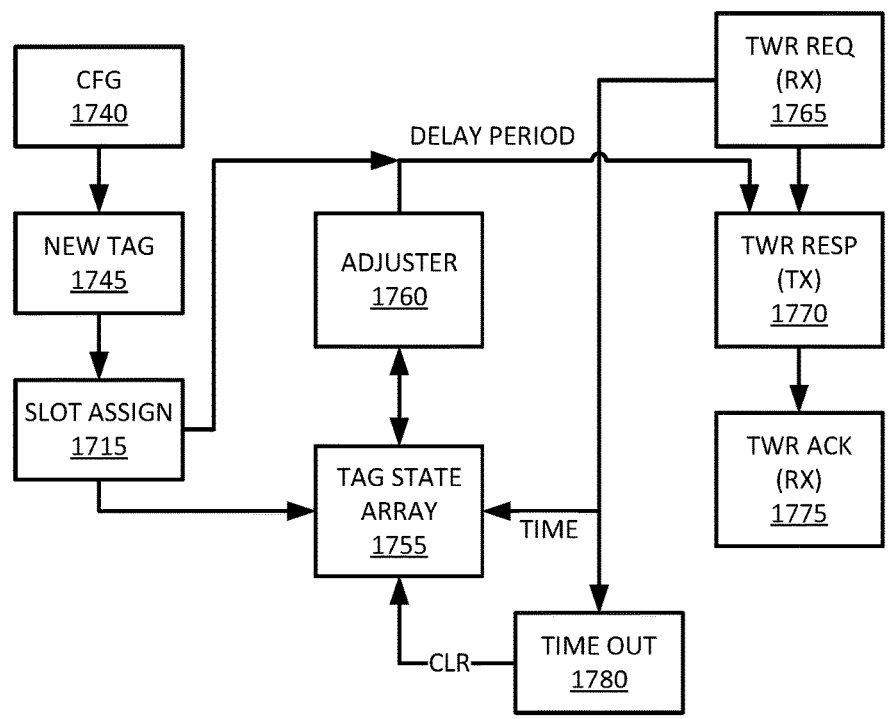

FIG. 17B shows a flow diagram detailing the actions performed by the master anchor $A_M$ in one exemplary implementation of the installation 100. During the configuration window, the master anchor $A_M$ receives a configuration request at step 1740, and determines at step 1745 that the configuration request came from a new tag. At step 1750, the master anchor $A_M$ assigns a new reserved time slot for the tags' transactions. Information relating to the slot assignment is recorded in a tag state array 1755. During the transaction window, the master anchor $A_M$ receives a two-way ranging request from one tag (step 1765), transmits a two-way ranging response at step 1770, and receives a two-way ranging acknowledgment at step 1775. Transmission time information relating to the two-way ranging request received in step 1765 is recorded in the tag state array 1755. The tag state array is accessed by the adjuster 1760, which continually monitors the transmission time performance of the tags to determine how accurately each tag transmits packets within its reserved time slot. The adjuster incorporates time adjustment parameters into the transmission of the two way ranging response 1770 when required. The master anchor $A_M$ may also update the tags' delay periods to ensure timely transaction packet transmissions. If the master anchor $A_M$ does not receive a two-way ranging request during the transaction window, the master anchor $A_M$ then proceeds to a time out step 1780, during which it may clear the tag state array.

The delay period shown in FIG. 17A for a device's first two-way ranging time ($t_{twr}$) is calculated when a configuration request packet is received by the master anchor $A_M$. Referring back to FIG. 13, if the request originates from a tag, then the first delay is equal to the time remaining in the configuration window 1305, plus the time from the start of the transaction window 1310 to that device's reserved transaction slot, which refers to the ordering of transactions within a window, as opposed to the timing of transactions, plus 50000 microseconds multiplied by the number of time division blocks 1300 that pass before the specific transaction. The calculation for a slave anchor $A_{S(n)}$ is essentially the time remaining in the configuration window 1305, plus the length of the transaction window 1310, plus the time from the start of the slave window 1315 to its data packet transaction.

When the transaction response packet is assembled, the system may be configured to include a tag period setting for the tag so that the tag will know when to attempt to retransmit its payload data (should packets be dropped during the first attempt). When the master anchor $A_M$ receives a transaction packet from the tag, the master anchor $A_M$ calculates an adjusted tag period for the tag using the following formula:

$$t_{adjust} = \mathrm{mod}(t_{transaction}, t_{block}) - \mathrm{mod}(t_{rx}, t_{block}),$$

where, $t_{adjust}$ is the adjusted tag period, $t_{transaction}$ is the expected time of receiving the transaction packet, $t_{block}$ is the duration of the time division block, and $t_{rx}$ is the time the packet was actually received.

Tag period setting values correspond to the number of time division blocks between data packet transactions. A tag period setting of 0 is thus 20 Hz, and a tag period setting of 1 is 10 Hz. The tag's next time to start a two-way ranging transaction ($t_{twr}$) is determined by multiplying the number of time division blocks by 50000 microseconds (the size of the time division block). The adjusted tag period (tadjust) is added to the start of the next two-way ranging transaction (ttwr) before it is sent to the tag. The number of blocks until the next two-way ranging transaction is determined by the phase and the tag period setting of the master anchor $A_M$. The current phase, relative to the requesting tag, is the current time on the master device divided by 50000, modulo the tag period setting for the tag.

The scheduling algorithm of the implementation coordinates the transmission of a plurality of tags joined to a wireless data communications network. Because the nodes each have their own time domains, which are subject to drift relative to each other and to the network, the present solution imposes a precise time scheme for the nodes to take action within a distributed system. The system can determine slot transmission performance with a tolerance of +/−10 microseconds, which is sufficient precision to enable the system to process a plurality of data packet transactions with near 100% use of available channel capacity. This centralized scheduling approach saves battery life at the nodes by having them follow designated time periods, saving power when the node is not transmitting, as radio frequency transmissions can be costly in terms of power used. The whole architecture is biased to save battery power at tags, and only needs to calculate adjustment at one place in the network. Therefore, the tags are not required to take any more actions than are necessary.

The foregoing disclosure is only intended to be exemplary of the methods and products of the present invention. Departures from and modifications to the disclosed embodiments may occur to those having skill in the art. The scope of the invention is set forth in the following claims.

We claim:

1. A method for automatically identifying and indicating whether a player has scored a goal in a sporting activity, wherein 1) each of a plurality of players participating in the sporting activity has a remotely identifiable player tag associated therewith and 2) a game-play object that is manipulated within a field of play and used to score by being passed through a goal has a remotely identifiable object tag associated therewith, the method comprising:

identifying the position in three-dimensional space of each of the players and the game-play object by means of their associated tags; and using the identified positions of the players and the game-play object, evaluating proximity of the game-play object to the players to assess whether any of the players is in possession of the game-play object;

if no player is sufficiently close to the game-play object to be in possession of the game-play object, then determining whether the game-play object is in a goal zone region, the goal zone region comprising a predefined, limited region in space surrounding the goal, and if the game-play object is determined to be in the goal zone region, then determining whether the game-play object has been within an attempt zone, the attempt zone comprising a smaller predefined, limited region in space within the goal zone region and also surrounding the goal, and if the game-play object is determined to be in the goal zone and to have been within the attempt zone, then determining whether a goal has been made by evaluating whether the game-play object passed in order through a plurality of predefined discrete sub-regions before, at, and after the goal, which plurality of sub-regions are within the attempt zone, and if the game-play object has passed in order through the plurality of predefined discrete sub-regions before, at, and after the goal, then indicating that a score has been made.

2. The method of claim 1, further comprising identifying as the player who has scored a last player to have been in possession of the ball.

3. The method of claim 1, wherein said evaluating proximity of the game-play object to the players uses one region in space surrounding a putative player in possession of the game-play object to evaluate proximity of the game-play object to the putative player in possession and to determine whether the putative player in possession of the game-play object has gained possession of the game-play object, and wherein said evaluating proximity of the game-play object to the players uses another, larger region in space surrounding a player who has been determined to be in possession of the game-play object to evaluate proximity of the game-play object to the player who has been determined to be in possession of the game-play object and to determine whether the player who has been determined to be in possession of the game-play object is still in possession of the game-play object.

4. The method of claim 3, wherein said another, larger region in space has a larger permissible horizontal distance within which possession of the game-play object will be found than said one region in space has.

5. The method of claim 3, wherein said another, larger region in space has a larger permissible vertical range within which possession of the game-play object will be found than said one region in space has.

6. The method of claim 1, wherein assessing whether any of the players is in possession of the game-play object comprises assessing how long the game-play object is within a predefined region in space around a player who has been identified as putatively in possession of the game-play object.

7. The method of claim 1, further comprising identifying a player among said plurality of players who is closest to the game-play object.

8. The method of claim 7, wherein the player who is closest to the game-play object is determined to have possession of the game-play object only if the game-play object is within a predefined horizontal distance from the player who is closest to the game-play object.

9. The method of claim 7, wherein the player who is closest to the game-play object is determined to have possession of the game-play object only if the game-play object is within a predefined vertical distance from the player who is closest to the game-play object.

10. The method of claim 1, wherein a second goal is present in the field of play, the second goal being surrounded by a second goal zone region; and evaluating whether the game-play object is in a goal zone region comprises determining whether the game-play object is within said second goal region.

11. The method of claim 1, wherein the player tags and the object tag include radio-enabled transceivers and wherein a plurality of radio-enabled anchor transceivers are distributed around the field of play at known locations, and wherein the position in three-dimensional space of each of the players is identified by means of radio communication between the player tags and the anchor transceivers and the position in three-dimensional space of the game-play object is identified by means of radio communication between the object tag and the anchor transceivers.

12. A system for tracking players and a game-play object on a field of play including at least one goal and for automatically identifying and indicating whether a score has been made, the system comprising:
a plurality of player tags and an object tag;
a plurality of sensors which are able to remotely detect the player tags and the object tag; and
a computing device having a processor and non-transitory program instructions contained in computer memory thereof;
wherein the non-transitory program instructions are configured to cause the processor to execute the steps comprising
receiving data from the plurality of sensors;
identifying from the received data the position in three-dimensional space of each of the players and the game-play object by means of their associated tags; and
using the identified positions of the players and the game-play object, evaluating proximity of the game-play object to the players to assess whether any of the players is in possession of the game-play object;
wherein if no player is sufficiently close to the game-play object to be in possession of the game-play object, then evaluating whether the game-play object is in a goal zone region, which goal zone region is a predefined, limited region in space surrounding the goal, and
if the game-play object is determined to be in the goal zone region, then evaluating whether the game-play object has been within an attempt zone, which attempt zone is a smaller predefined, limited region in space within the goal zone region and also surrounding the goal, and
if the game-play object is determined to be in the goal zone and to have been within the attempt zone, then determining whether a goal has been made by evaluating whether the game-play object passed in order through a plurality of predefined discrete sub-regions before, at, and after the goal, which plurality of sub-regions are within the attempt zone, and
if the game-play object has passed in order through the plurality of predefined discrete sub-regions before, at, and after the goal, then indicating that a score has been made.

13. The system of claim 12, wherein the program instructions are further configured to identify as the player who has scored a last player to have been in possession of the ball.

14. The system of claim 12, further comprising a data structure stored in memory and defining first and second possession zones,
wherein the program instructions are configured such that the first possession zone, which is a region in space surrounding a potential player in possession of the game-play object, is used to evaluate proximity of the game-play object to the players to assess whether any of the players has putatively gained possession of the game-play object, and
wherein the program instructions are configured such that the second possession zone, which is a larger region in space than the first possession zone and surrounding a player who has been determined to be in possession of the game-play object, is used to evaluate proximity of the game-play object to the player who has been determined to be in possession of the game-play object, to assess whether the player who has been determined to be in possession of the game-play object is still in possession of the game-play object.

15. The system of claim 14, wherein the second possession zone has a larger permissible horizontal distance within which possession of the game-play object will be found than the first possession zone has.

16. The system of claim 14, wherein the second possession zone has a larger permissible vertical range within which possession of the game-play object will be found than the first possession zone has.

17. The system of claim 12, wherein the program instructions are configured such that the processor-executed step of assessing whether any of the players is in possession of the game-play object comprises assessing how long the game-play object is within a predefined region in space around a player who has been identified as putatively in possession of the game-play object.

18. The system of claim 12, wherein the program instructions are configured such that the processor-executed step of assessing whether any of the players is in possession of the game-play object includes identifying a player among said plurality of players who is closest to the game-play object.

19. The system of claim 18, wherein the program instructions are configured such that the player who is closest to the game-play object is determined to have possession of the game-play object only if the game-play object is within a predefined horizontal distance from the player who is closest to the game-play object.

20. The system of claim 18, wherein the program instructions are configured such that the player who is closest to the game-play object is determined to have possession of the game-play object only if the game-play object is within a predefined vertical distance from the player who is closest to the game-play object.

21. The system of claim 12, further comprising:
a second goal in the field of play, the second goal being surrounded by a second goal zone region; and
the program instructions are further configured to determine whether the game-play object is in the second goal zone region.

22. The system of claim 21, wherein the program instructions are further configured to
determine whether the game-play object was previously within a second attempt zone, the second attempt zone comprising a smaller, predefined, limited region in space within the second goal zone region and also surrounding the second goal; and
indicate on the computing device that a score has occurred if (a) the game-play object was determined to have been in both the second goal zone region and the second attempt zone, and (b) the game-play object has passed in order through a second plurality of predefined, discrete sub-regions before, at, and after the second goal, the second plurality of discrete sub-regions being located within the second attempt zone.

23. The system of claim 12, wherein the player tags and the object tag include radio-enabled transceivers and the plurality of sensors include radio-enabled transceivers which are able to communicate electronically with the player tags and the object tag; and
wherein the position in three-dimensional space of each of the players is identified by means of radio communication between the player-tag transceivers and the sensor transceivers, and the position in three-dimensional space of the game-play object is identified by means of radio communication between the object-tag transceiver and the sensor transceivers.

24. The system of claim 12, wherein the plurality of sensors are distributed around the field of play.

25. The system of claim 12, wherein the object tag is embedded within or attached to a basketball.

\* \* \* \* \*